United States Patent
Ma et al.

(10) Patent No.: US 12,177,824 B2
(45) Date of Patent: Dec. 24, 2024

(54) SERVING SYNCHRONIZATION SIGNAL BLOCK (SSB) INDICATION FOR BEAM SWITCHING AND BANDWIDTH PART (BWP) SWITCHING

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Huilin Xu, Temecula, CA (US); Ayan Sengupta, San Diego, CA (US); Changhwan Park, San Diego, CA (US); Peter Gaal, San Diego, CA (US); Bharat Shrestha, San Diego, CA (US); Umesh Phuyal, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 17/662,059

(22) Filed: May 4, 2022

(65) Prior Publication Data

US 2022/0369317 A1 Nov. 17, 2022

Related U.S. Application Data

(60) Provisional application No. 63/187,146, filed on May 11, 2021.

(51) Int. Cl.
*H04W 72/0453* (2023.01)
*H04B 1/713* (2011.01)
(Continued)

(52) U.S. Cl.
CPC ........ *H04W 72/0453* (2013.01); *H04B 1/713* (2013.01); *H04W 72/046* (2013.01); *H04W 72/23* (2023.01)

(58) Field of Classification Search
None
See application file for complete search history.

(56) References Cited

U.S. PATENT DOCUMENTS

2019/0313411 A1\* 10/2019 Ly ..................... H04W 72/0453
2021/0119697 A1\* 4/2021 Wang ................. H04B 7/18543
(Continued)

FOREIGN PATENT DOCUMENTS

EP 3780770 A1 2/2021
EP 3799491 A1 3/2021

OTHER PUBLICATIONS

International Search Report and Written Opinion—PCT/US2022/027940—ISA/EPO—Aug. 12, 2022.
(Continued)

*Primary Examiner* — Otis L Thompson, Jr.
(74) *Attorney, Agent, or Firm* — Patterson + Sheridan, LLP

(57) ABSTRACT

Aspects of the present disclosure provide systems and methods for informing a user equipment (UE) that which beam the UE is being served, for example, such as in relation to bandwidth part (BWP) switching in a non-terrestrial network (NTN). According to certain aspects, a network entity may transmit to a user equipment (UE) signaling indicating at least one BWP switch. The network entity provides, to the UE, an indication of a serving synchronization signal block (SSB) for the UE to use after the BWP switch.

28 Claims, 17 Drawing Sheets

(51) Int. Cl.
*H04W 72/044* (2023.01)
*H04W 72/23* (2023.01)

(56) References Cited

U.S. PATENT DOCUMENTS

| | | | | |
|---|---|---|---|---|
| 2022/0007248 A1* | 1/2022 | Shrestha | | H04W 24/08 |
| 2022/0264344 A1* | 8/2022 | Wu | | H04W 24/08 |
| 2022/0408389 A1* | 12/2022 | Wang | | H04B 7/18513 |
| 2023/0284277 A1* | 9/2023 | Park | | H04W 84/06 |
| | | | | 370/329 |
| 2024/0163152 A1* | 5/2024 | Wang | | H04W 28/26 |

OTHER PUBLICATIONS

Moderator (OPPO): "Summary #3 of 8.4.4 Other Aspects of NR-NTN", 3GPP TSG RAN WG1 Meeting #104e, R1-2102141, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Feb. 4, 2021, XP051976099, 57 Pages.

ZTE: "Discussion on Additional Enhancement for NR-NTN", 3GPP TSG RAN WG1 #104e, R1-2100247, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970310, 6 Pages.

* cited by examiner

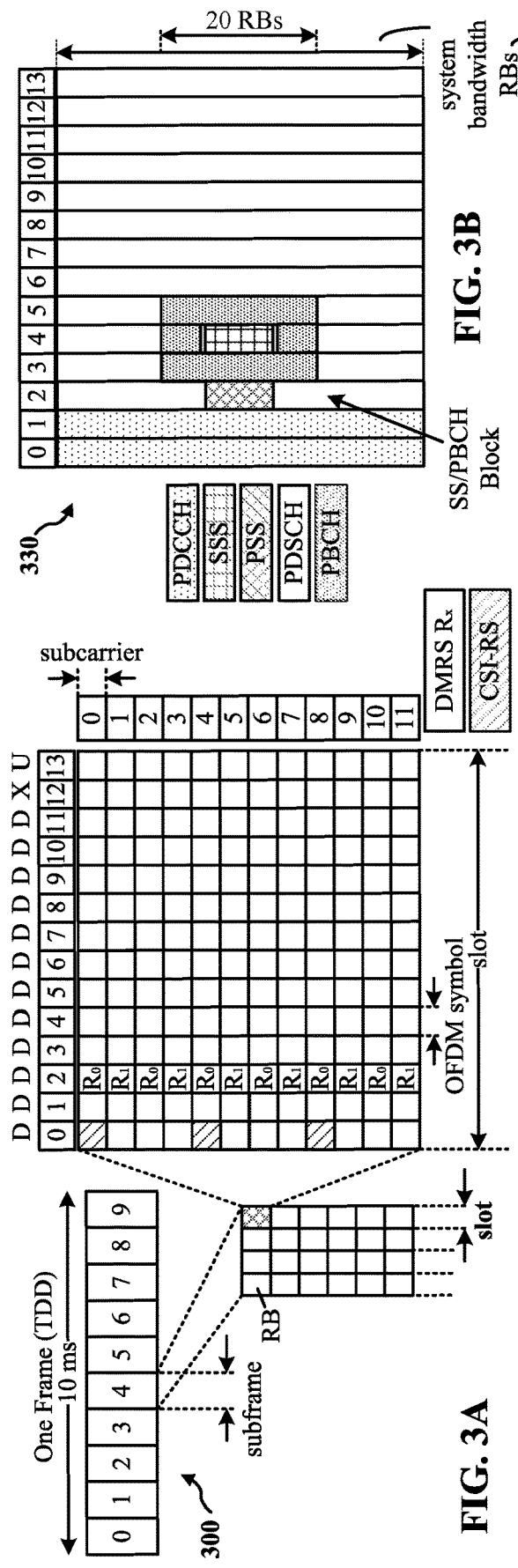
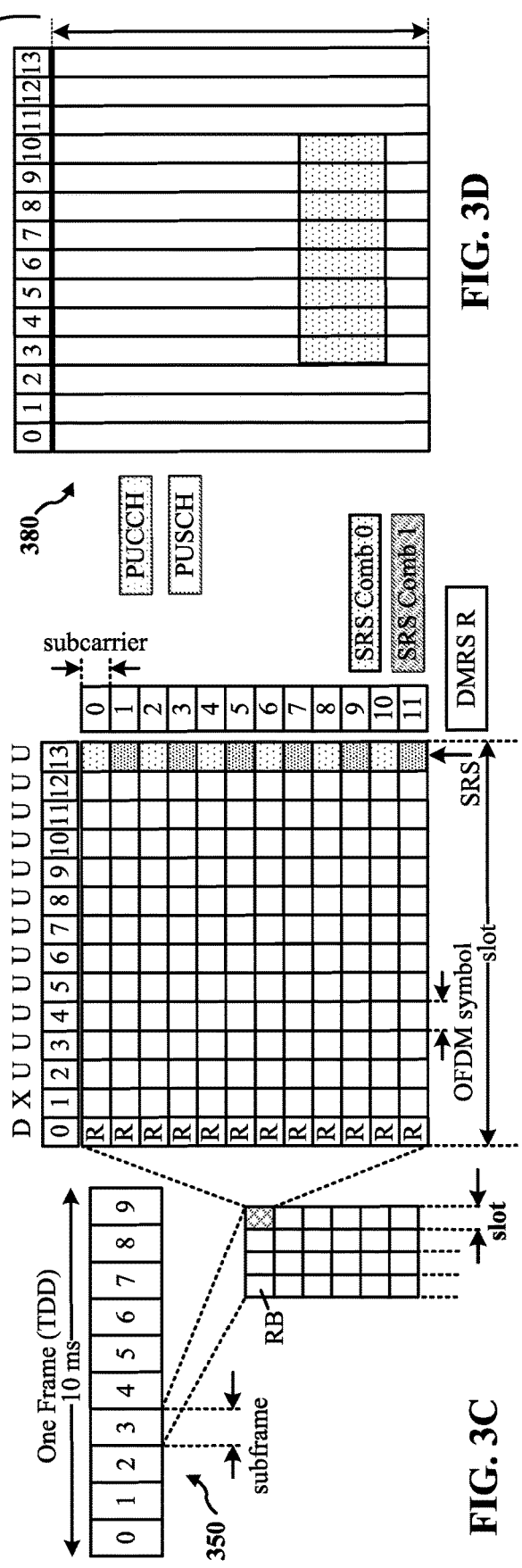
FIG. 3A
FIG. 3B
FIG. 3C
FIG. 3D

Each hatching represents a BWP, and the beams are active simultaneously

```
600
    ↙

RadioLinkMonitoringConfig ::=  SEQUENCE {
    failureDetectionResourcesToAddModList    SEQUENCE (SIZE (1..maxNrofFailureDetectionResources)) OF RadioLinkMonitoringRS
                                                                                                   OPTIONAL, -- Need N
    failureDetectionResourcesToReleaseList   SEQUENCE (SIZE (1..maxNrofFailureDetectionResources)) OF RadioLinkMonitoringRS-Id
                                                                                                   OPTIONAL, -- Need N
    beamFailureInstanceMaxCount              ENUMERATED {n1, n2, n3, n4, n5, n6, n8, n10}          OPTIONAL, -- Need R
    beamFailureDetectionTimer                ENUMERATED {pbfd1, pbfd2, pbfd3, pbfd4, pbfd5, pbfd6, pbfd8, pbfd10}  OPTIONAL, -- Need R
    ...
}

RadioLinkMonitoringRS ::=  SEQUENCE {
    radioLinkMonitoringRS - Id    RadioLinkMonitoringRS - Id,
    purpose                       ENUMERATED {beamFailure, rlf, both},
    detectionResource             CHOICE {
        ssb-Index            610—  SSB – Index,
        csi - RS - Index           NZP-CSI-RS-ResourceId
    },
    ...
}
```

FIG. 6

SERVING SYNCHRONIZATION SIGNAL BLOCK (SSB) INDICATION FOR BEAM SWITCHING AND BANDWIDTH PART (BWP) SWITCHING

CROSS-REFERENCE TO RELATED APPLICATIONS

This application claims the benefit of and priority to U.S. Provisional Patent Application No. 63/187,146, filed on May 11, 2021, the entire contents of which are incorporated herein by reference.

INTRODUCTION

Aspects of the present disclosure relate to wireless communications, and more particularly, to techniques for bandwidth part (BWP) and/or beam switching.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a network entity. The method generally includes transmitting, to a user equipment (UE), signaling indicating at least one bandwidth part (BWP) switch; and providing, to the UE, an indication of a serving synchronization signal block (SSB) for the UE to use after the BWP switch.

Another aspect provides a method for wireless communication by a user equipment (UE). The method generally includes receiving, from a network entity, signaling indicating at least one bandwidth part (BWP) switch; receiving, from the network entity, an indication of a serving synchronization signal block (SSB) for the UE to use after the BWP switch; performing the BWP switch; and performing a beam switch based on the serving SSB.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE FIGURES

The appended figures depict certain features of the various aspects described herein and are not to be considered limiting of the scope of this disclosure.

FIGS. 3A-3D depict various example aspects of data structures for a wireless communication network.

FIG. 6 depicts an example code describing radio link monitoring (RLM) configuration and synchronization signal block (SSB) index, in accordance with certain aspects of the present disclosure.

DETAILED DESCRIPTION

Figure 1:
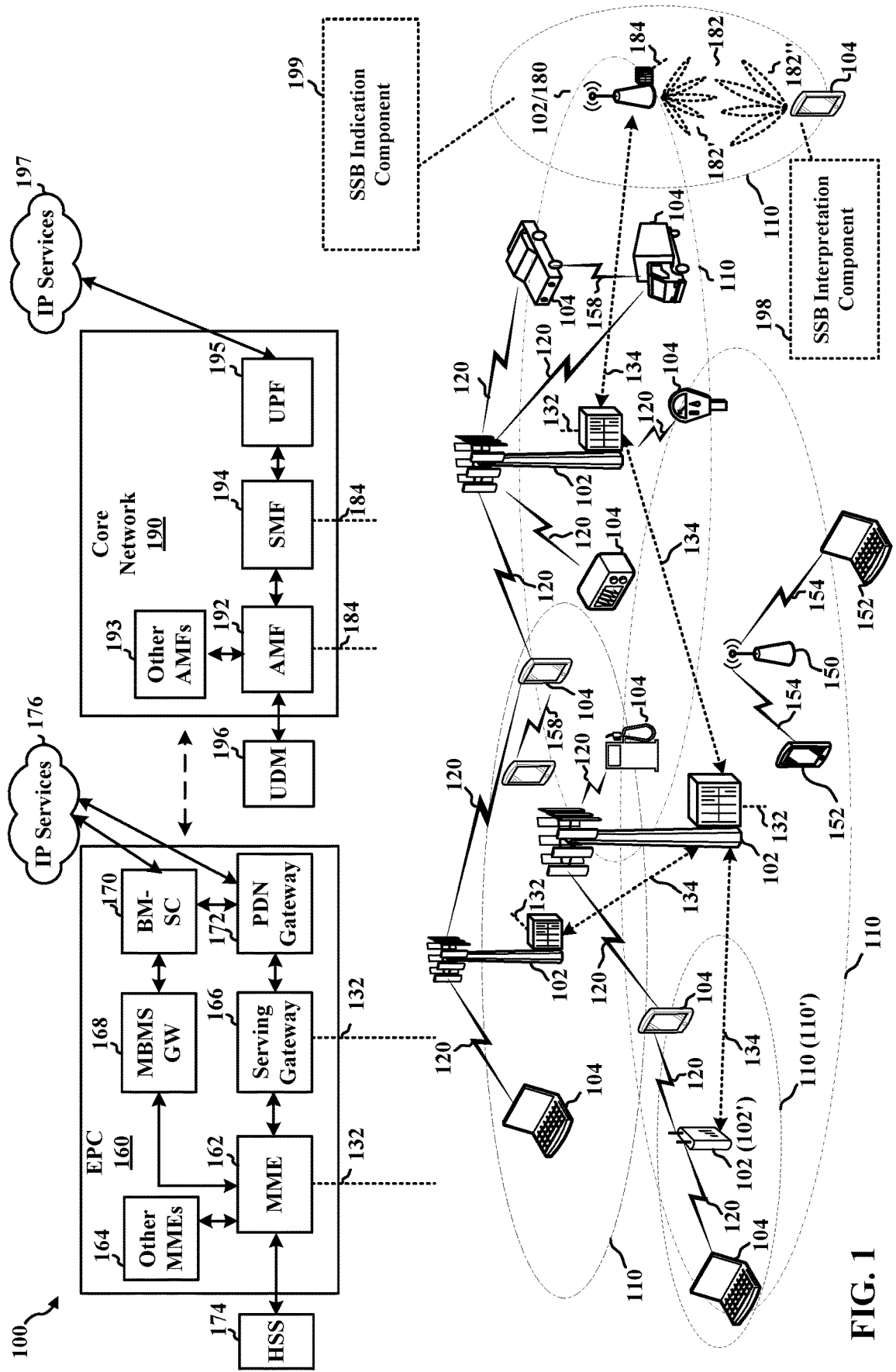
FIG. 1 is a block diagram conceptually illustrating an example wireless communication network, in accordance with certain aspects of the present disclosure.

Aspects of the present disclosure provide systems and methods for informing a user equipment (UE) which beam is being used to serve the UE after a bandwidth part (BWP) switch, for example, in a non-terrestrial network (NTN). According to certain aspects, a network entity may transmit to a user equipment (UE) signaling indicating at least one BWP switch. The network entity provides, to the UE, an indication of a serving synchronization signal block (SSB) associated with a serving for the UE to use after the BWP switch. In some aspects, a serving SSB identifies a serving beam where the data communication (e.g., on PDSCH) between the UE and the network takes place.

In NTN, a BWP may be utilized by multiple beams: for example, two different active beams may use a common BWP. As such, after a BWP switch it is advantageous for the UE to know its serving beam (and the corresponding compensation) so that the UE may more correctly and/or more efficiently decode or process the dynamic transmissions (e.g., using the known frequency compensation) than in cases when the UE does not know the serving beam.

Furthermore, it is advantageous for the UE to identify the current serving beam for event triggered beam measurement report. For example, the UE may be configured to report certain measurement events when certain conditions are satisfied. The certain conditions may be that when the reference signal received power (RSRP) of the current serving beam, when known by the UE, is worse than that of a neighboring beam. Such condition triggers the UE to send a measurement report to the network.

In existing methods of operations, beam switching may be indicated via transmission configuration indicator (TCI) in some scenarios and the UE may not be aware of its serving beam in other scenarios. For example, current NR specification supports beam switching through TCI of quasi-colocation (QCL) Type D. The TCI information may indicate to the UE about which receiving beam the UE may use next. In some instances, the TCI may be indicated by medium access control (MAC) control element (CE) to change the transmission beam and its spatial receiver parameters for physical downlink control channel (PDCCH) and physical downlink shared channel (PDSCH). In some instances, the TCI may be indicated by downlink control information (DCI) to change the transmission beam for PDSCH. Such use of TCI is limited to the Frequency Range 2 (FR2) and that TCI bits may not be present in the DCI. As such, the UE may not fully rely on TCI to identify its serving beam.

In general, a UE currently needs not monitor the radio link monitoring (RLM) reference signal (RS) that is outside the UE's active BWP. In some cases, a network entity may indicate to the UE a BWP configuration (e.g., in new radio (NR)), and configure parameters such as frequency location and bandwidth, subcarrier spacing (SCS), cyclic prefix duration, control resource set (CORESET) 0, and/or search space 0. The network may configure possible options for a given parameter, and leave the selection and/or activation of a particular option to other commands such as those provided via DCI, MAC CE, or radio resource control (RRC) at a later time. For example, the network entity may configure multiple time-domain resource allocation patterns for PDSCHs and later selecting one of them for a particular PDSCH using a DCI. As such, the UE does not receive serving beam indication in existing specifications. This disclosure provides techniques for indicating the serving beam to the UE to allow for the aforementioned advantages.

Brief Introduction to Wireless Communication Networks

FIG. 1 depicts an example of a wireless communications system 100, in which aspects described herein may be implemented. While FIG. 1 is briefly introduced here for context, additional aspects of FIG. 1 are described below.

Figure 7:
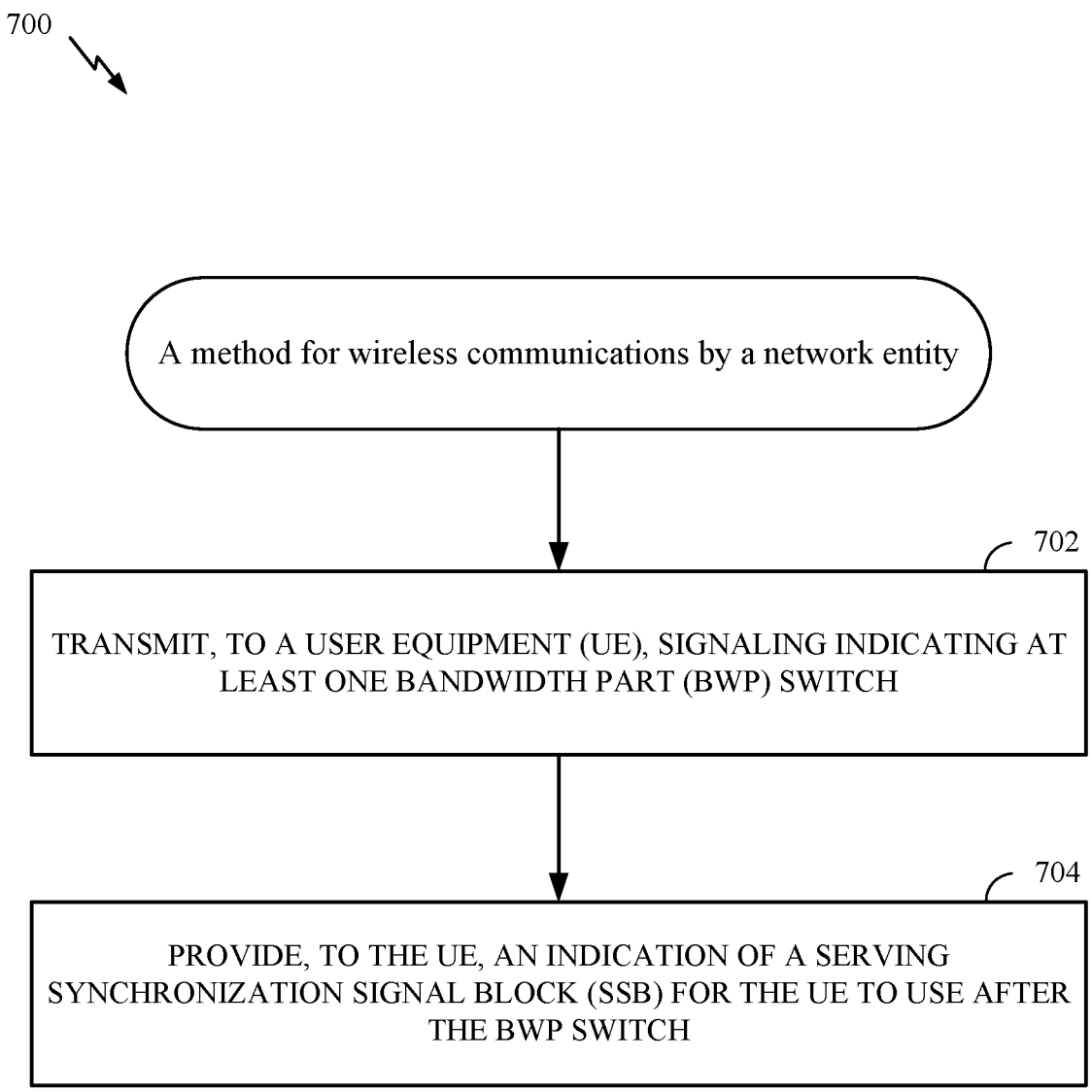
FIG. 7 depicts a flow diagram illustrating example operations for wireless communication by a network entity, in accordance with certain aspects of the present disclosure.
Figure 13:
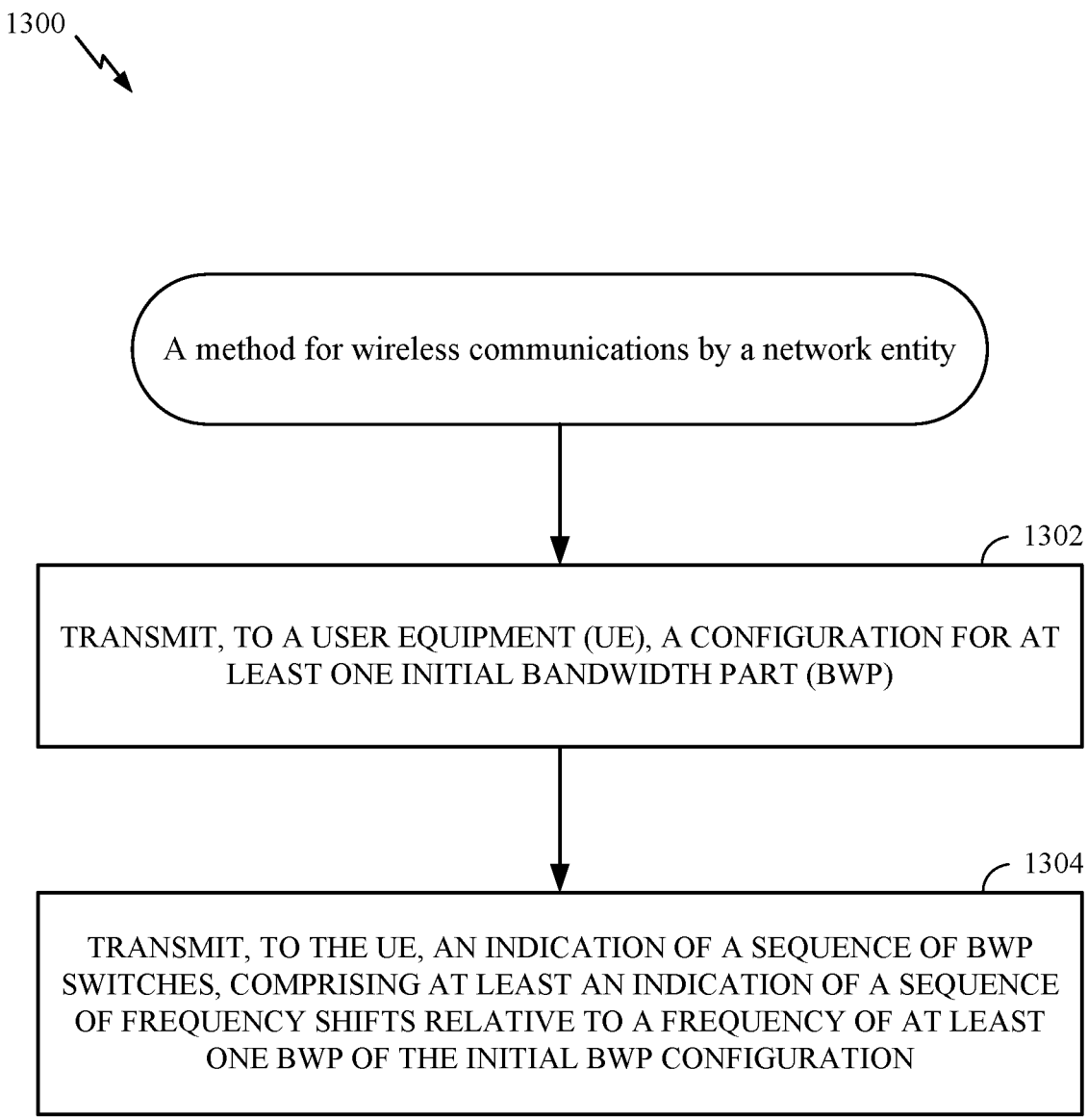
FIG. 13 depicts a flow diagram illustrating example operations for wireless communication by a network entity, in accordance with certain aspects of the present disclosure.

For example, wireless communication network 100 may include synchronization signal block (SSB) indication component 199, which may be configured to perform, or cause a base station (BS) 102 to perform, operations 700 of FIG. 7 or operations 1300 of FIG. 13. Wireless communication network 100 may also include SSB interpretation component 198, which may be configured to perform, or cause a user equipment (UE) 104 to perform, operations 800 of FIG. 8 or operations 1400 of FIG. 14.

Generally, wireless communications system 100 includes BSs 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 2:
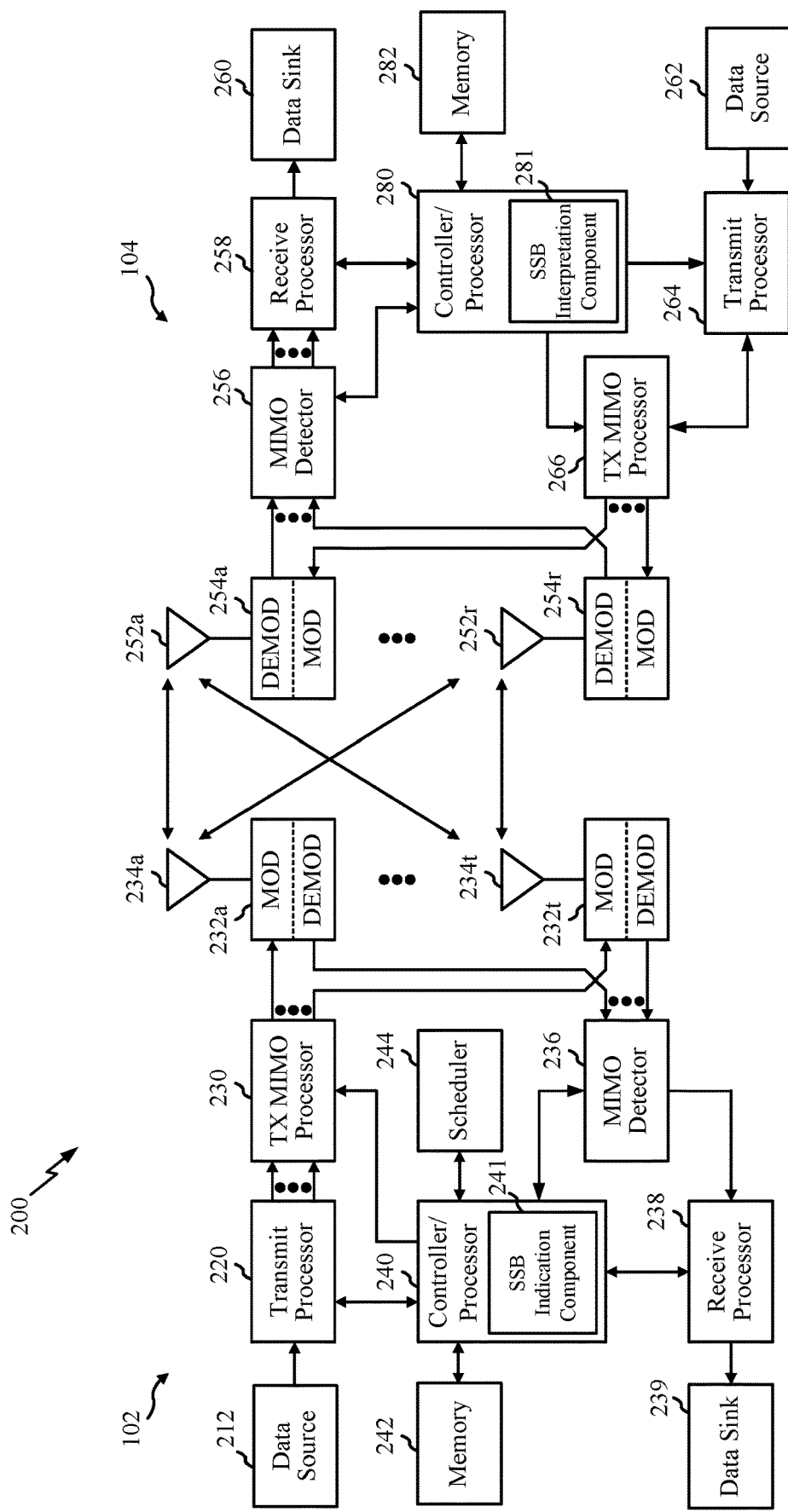
FIG. 2 is a block diagram conceptually illustrating aspects of an example a base station (BS) and user equipment (UE), in accordance with certain aspects of the present disclosure.

FIG. 2 depicts certain example aspects of a BS 102 and a UE 104. As with FIG. 1, FIG. 2 is briefly introduced here for context and additional aspects of FIG. 2 are described below.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes SSB indication component 241, which may be representative of SSB indication component 199 of FIG. 1. Notably, while depicted as an aspect of controller/processor 240, SSB indication component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

UE 104 includes controller/processor 280, which may be configured to implement various functions related to wireless communications. In the depicted example, controller/processor 280 includes SSB interpretation component 281, which may be representative of SSB interpretation component 198 of FIG. 1. Notably, while depicted as an aspect of controller/processor 280, SSB interpretation component 281 may be implemented additionally or alternatively in various other aspects of UE 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Brief Introduction to mmWave Wireless Communications

The electromagnetic spectrum is often subdivided, based on frequency/wavelength, into various classes, bands, channels, etc. In various aspects, a frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" band in documents and articles, despite being different from the extremely high frequency (EHF) band (30 GHz-300 GHz), which is identified by the International Telecommunications Union (ITU) as a "millimeter wave (mmW)" band because wavelengths at these frequencies are between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmW/near mmW radio frequency band (e.g., 3 GHz-300 GHz) may have higher path loss and a shorter range compared to lower frequency communications. Accordingly, in FIG. 1, mmW base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Brief Introduction to QCL Information and TCI States

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one channel state information reference signal (CSI-RS) set and the PDSCH demodulation reference signal (DMRS) ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. Each configured TCI state may include one RS set TCI-RS-SetConfig that indicates different QCL assumptions between certain source and target signals.

The association of DL reference signals with corresponding QCL types that may be indicated by a TCI reference signal configuration information (TCI-RS-SetConfig), in which a source reference signal (RS) is associated with a target signal. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSI-RS, tracking reference signal (TRS), and sounding reference signal (SRS).

Each TCI-RS-SetConfig set contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

For the case of two DL RSs, the QCL types can take on a variety of arrangements. For example, QCL types may not be the same, regardless of whether the references are to the same DL RS or different DL RSs. In the illustrated example, SSB is associated with Type C QCL for phase tracking reference signal (PTRS), while CSI-RS for beam management is associated with Type D QCL.

QCL information and/or types may in some scenarios depend on or be a function of other information. For example, the quasi co-location (QCL) types indicated to the UE can be based on higher layer parameter QCL-Type and may take one or a combination of the following types:
QCL-TypeA: {Doppler shift, Doppler spread, Average delay, Delay spread},
QCL-TypeB: {Doppler shift, Doppler spread},
QCL-TypeC: {Average delay, Doppler shift}, and
QCL-TypeD: {Spatial Rx parameter},
Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

An initial CORESET (e.g., CORESET ID 0 or simply CORESET #0) in NR may be identified during initial access by a UE (e.g., via a field in the master information block (MIB)). A ControlResourceSet information element (CORESET IE) sent via radio resource control (RRC) signaling may convey information regarding a CORESET configured for a UE. The CORESET IE generally includes a CORESET ID, an indication of frequency domain resources (e.g., number of RBs) assigned to the CORESET, contiguous time duration of the CORESET in a number of symbols, and Transmission Configuration Indicator (TCI) states.

As noted above, a subset of the TCI states provide quasi co-location (QCL) relationships between DL RS(s) in one RS set (e.g., TCI-Set) and PDCCH demodulation RS (DMRS) ports. A particular TCI state for a given UE (e.g., for unicast PDCCH) may be conveyed to the UE by the Medium Access Control (MAC) Control Element (MAC-CE). The particular TCI state is generally selected from the set of TCI states conveyed by the CORESET IE, with the initial CORESET (CORESET #0) generally configured via MIB.

Search space information may also be provided via RRC signaling. For example, the Search Space IE is another RRC IE that defines how and where to search for PDCCH candidates for a given CORESET. Each search space is associated with one CORESET. The Search Space IE identifies a search space configured for a CORESET by a search space ID. In an aspect, the search space ID associated with CORESET #0 is Search Space ID #0. The search space is generally configured via PBCH (MIB).

Brief Introduction to NTNs

Figure 4:
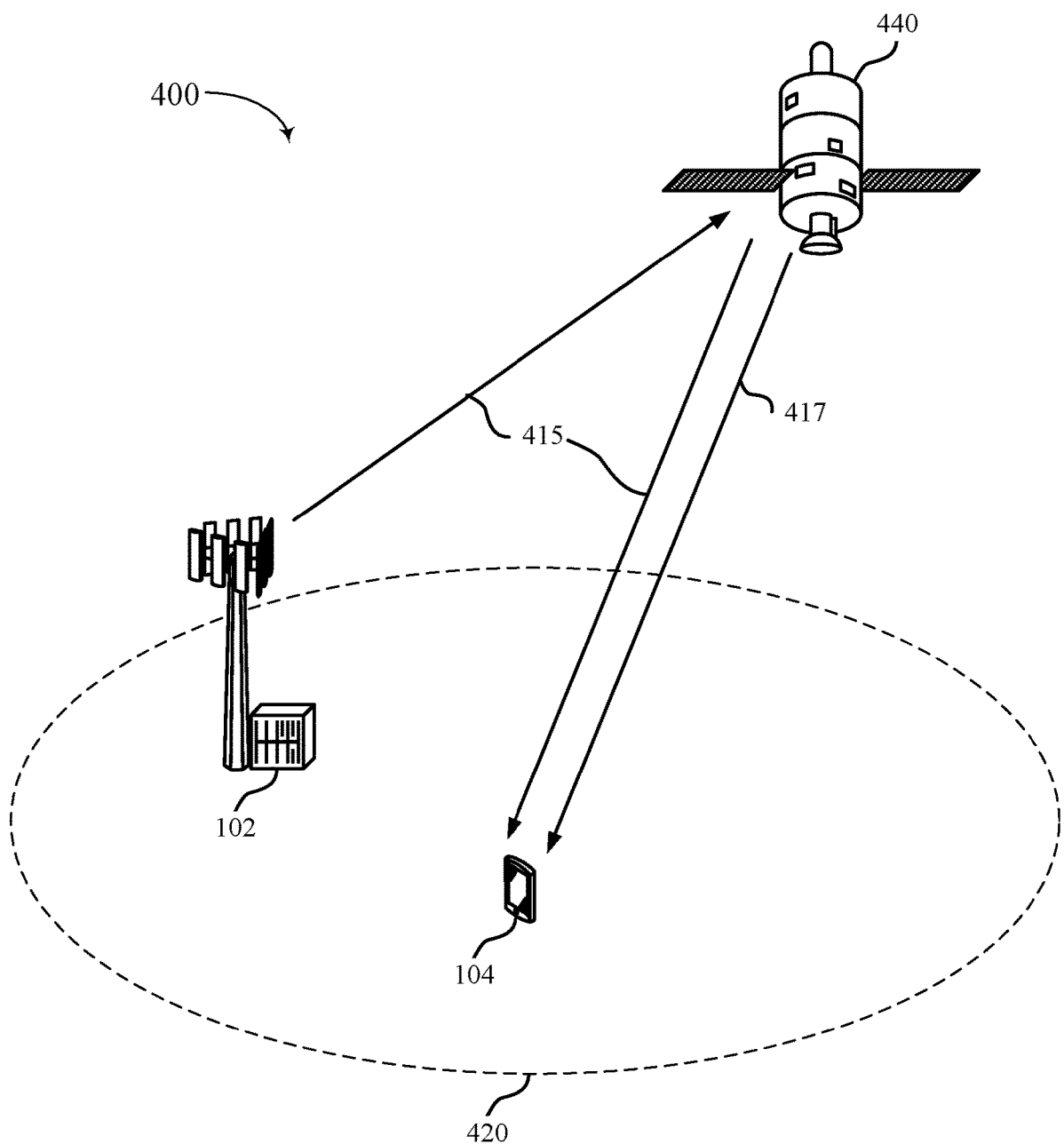
FIG. 4 depicts an example non-terrestrial network (NTN), in accordance with certain aspects of the present disclosure.

FIG. 4 illustrates an example of a wireless communications system 400 utilizing a non-terrestrial network (NTN), in which aspects of the present disclosure may be practiced. In some examples, wireless communications system 400 may implement aspects of wireless communication network 100. For example, wireless communications system 400 may include BS 102, UE 104, and satellite 440, which may be a medium earth orbit (MEO) or low earth orbit (LEO) satellite. BS 102 may serve coverage area or cell in cases of a terrestrial network, and satellite 440 may serve coverage area 420 in cases of a non-terrestrial network (NTN). Some NTNs use high altitude platforms (e.g., balloons) in place of satellites.

Satellite 440 may communicate with BS 102 and UE 104 as part of wireless communications in an NTN. In cases of a terrestrial network, UE 104 may communicate with BS 102 over a communication link. In the case of NTN wireless communications, satellite 440 may be the serving BS for UE 104. In certain aspects, the satellite 440 may act as a relay for the BS 102 and the UE 104, relaying both data transmission 415 and control signaling 417.

Satellite 440 may orbit the earth's surface at a particular altitude. The distance between satellite 440 and UE 104 may be much greater than the distance between BS 102 and UE 104. The distance between UE 104 and satellite 440 may cause an increased round-trip delay (RTD) in communications between UE 104 and satellite 440. The satellite motion may cause the Doppler Effect and contribute to a frequency shift in communications between UE 104 and satellite 440. The frequency shift may be also contributed to by error related to the local oscillation of either UE 104 or satellite 440. The RTD and frequency shift associated with communications in NTNs may lead to inefficiency in transmissions, latency, and inability to accurately transmit and receive messages.

UE 104 may determine to connect to satellite 440 using a random access procedure (e.g., a four-step RACH). The initiation of the RACH procedure may begin with the transmission of a random access preamble (e.g., NR PRACH) by UE 104 to satellite 140 or base station 102. UE 104 may transmit the random access preamble in the PRACH. In some PRACH designs, there may be no estimation or accounting for the RTD or the frequency shift associated with NTNs. In certain networks, such as terrestrial NR networks (e.g., 5G NR), SSBs transmitted by a cell are transmitted on the same frequency interval (e.g., occupying the same frequency interval). In NTN, a satellite may use multiple antennas to form multiple narrow beams (as shown in greater detail below with reference to FIG. 5) and the beams may operate on different frequency intervals to mitigate interference among the beams.

Example Beam Switching and BWP Switching by Frequency Shifting

Aspects of the present disclosure provide apparatuses, methods, processing systems, and computer-readable mediums for BWP switching using various signaling mechanisms. For example, such signaling mechanisms may include signaling frequency shifts (to be applied to a current BWP to determine a BWP to switch to) and/or by signaling a transmission configuration indicator (TCI) state configuration.

In certain networks, such as 5G New Radio (NR) network, a user equipment may communicate with the network via one or more cells (e.g., one or more serving cells) and using one or more component carriers (or carrier bandwidths). In 5G, each component carrier may be defined by one or more bandwidth parts (BWPs). In some cases, a bandwidth part may be considered as a contiguous set of physical resource blocks, selected from a contiguous subset of the common resource blocks for a given numerology on a given carrier. In some cases, the UE may be configured with a maximum of four BWPs in the downlink (DL) and uplink (UL) for a given carrier.

In NR, both BWP switching and beam switching may be performed. In a non-terrestrial network (NTN) (e.g., in NR), beam switching may be relatively frequent. For example, in low-Earth orbit (LEO) systems, the beam footprints are generally small relative to the speed of the satellites, and thus beam switching may occur frequently based on the speed of the satellite(s) and/or the beam footprint(s), as illustrated in FIG. 5.

Figure 5:
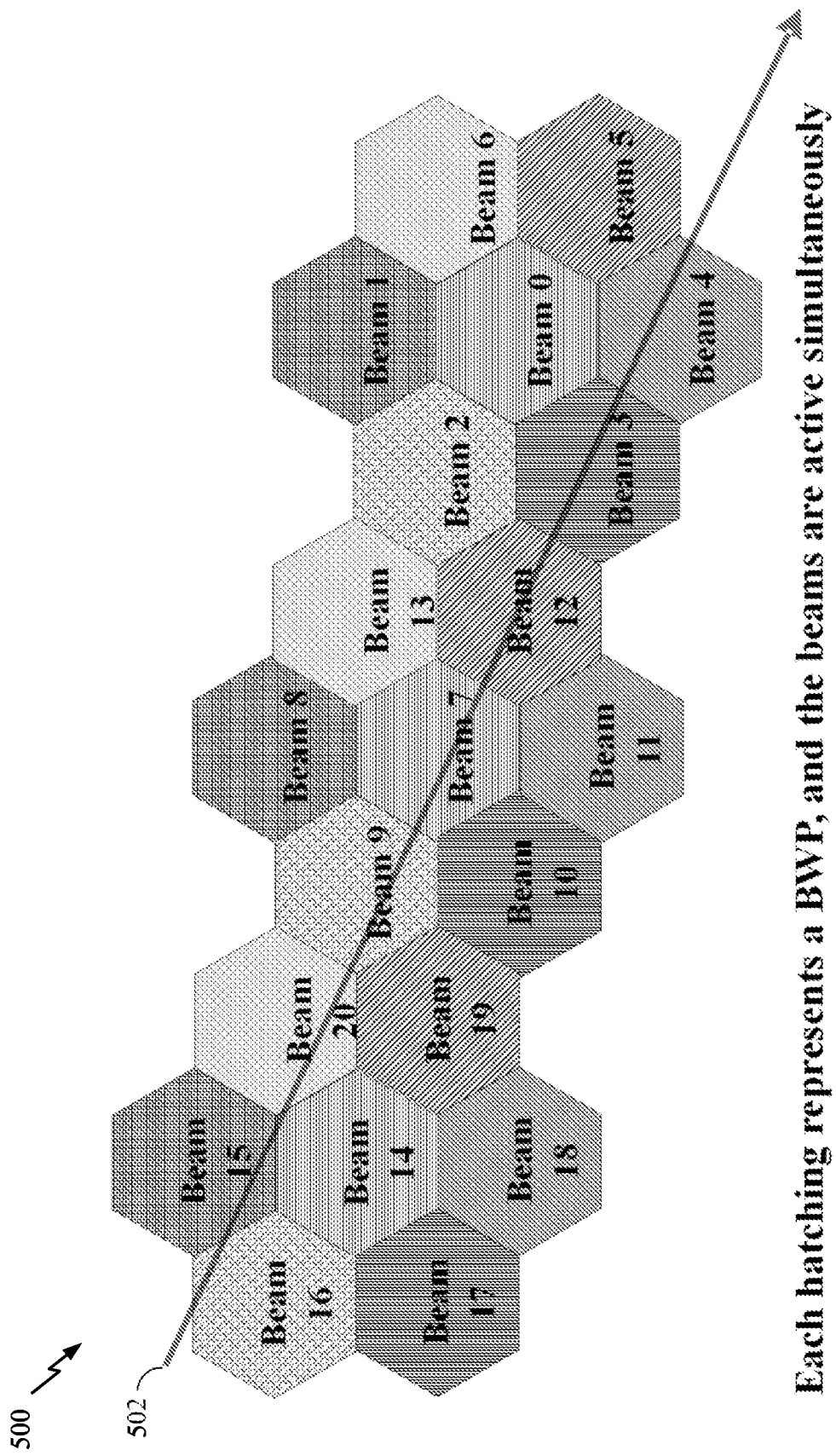
FIG. 5 depicts example beam footprints of a non-terrestrial network (NTN), in accordance with certain aspects of the present disclosure.

FIG. 5 is a conceptual illustration of multiple beams and multiple BWPs used for communication by a UE, in accordance with certain aspects of the present disclosure. As shown, each hexagon represents a beam (e.g., an area covered by a beam, which may be referred to as a beam footprint), and some sets of the multiple beams shown may correspond to a same BWP. For example, the beams 1, 8, and 15 may all correspond to a same BWP. Further, as shown, the arrow 502 indicates an example set of beams and BWPs that may be used as a UE moves (e.g., from beam 15 to beams 20, 9, 7, 12, 3, and 4 as the UE moves in the direction of arrow 502).

One possible way of beam switching generally includes the network configuring all beams from a satellite as a cell with an initial BWP pair per beam. The network may then signal, to the UE, which BWP to switch to as the beam footprints move. For NR terrestrial, at most 4 configured BWPs per UE may be supported.

In general, a BWP configuration may be provided for UL and DL communication. For the downlink BWP configuration (e.g., in NR), a network entity configures parameters such as frequency location and bandwidth, subcarrier spacing (SCS), cyclic prefix duration, control resource set (CORESET) 0, and/or search space 0. The network may configure various options for a given parameter, and leave the selection and/or activation of a particular option to other commands such as those provided via downlink control information (DCI), media access control (MAC) control element (CE), or radio resource control (RRC) at a later time. For example, the network entity may configure multiple time-domain resource allocation patterns for physical downlink shared channels (PDSCHs) and later select one of them for a particular PDSCH using a DCI. A similar mechanism may be used for the uplink BWP configuration.

As discussed above, because different beams may use the same BWP (e.g., Beams 4, 11, and 18 use a common BWP), it is advantageous for the UE to identify its serving beam. For example, the UE can more correctly and/or more efficiently decode or process the dynamic transmissions (e.g., using the known frequency compensation) when the UE knows the serving beam than in cases when the UE does not know the serving beam. The UE may also have event triggered beam measurement report by identifying the current serving beam. In some cases, the UE may identify the serving beam using the serving synchronization signal block (SSB).

FIG. 6 depicts an example code 600 describing a radio link monitoring (RLM) configuration and SSB index 610, in accordance with certain aspects of the present disclosure. As shown in the example code, the network entity may configure which RLM reference signal (RS) is at the first position or at the last position in the RLM RS sequence, as indicated by RadioLinkMonitoringConfig. Upon receiving of a list not using a particular list structure (e.g., ToAddModList and ToReleaseList), the UE may delete entries of the list currently in the UE configuration before applying the received list. The UE then considers each entry as newly created. The list as indicated by "SEQUENCE" in the example code is an ordered list. Therefore, the network entity controls which RLM RS is at the first position or last position of the list.

According to aspects of the present disclosure, such an RLM configuration may be used to identify a serving SSB (e.g., using SSB-Index) after a BWP switch.

Example Indication of Serving Synchronization Signal Block (SSB)

FIG. 7 is a flow diagram illustrating example operations 700 for wireless communication. The operations 700 may be performed, for example, by a network entity (e.g., such as the BS 102 in the wireless communication network 100 of FIG. 1). The operations 700 may be implemented as software components that are executed and run on one or more processors (e.g., the controller/processor 240 of FIG. 2). Further, transmission and reception of signals by the network entity in operations 700 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 700 begin, at 702, by transmitting, to a UE, signaling indicating at least one BWP switch. For example, the network entity may transmit the signaling using antenna(s) and transmitter/transceiver components of the BS 102 shown in FIG. 1 or FIG. 2 and/or of the apparatus shown in FIG. 13.

At 704, the network entity provides, to the UE, an indication of a serving synchronization signal block (SSB) for the UE to use after the BWP switch. For example, the network entity may send the signaling using antenna(s) and transmitter/transceiver components of the BS 102 shown in FIG. 1 or FIG. 2 and/or of the apparatus shown in FIG. 16. The indication of the serving SSB is discussed in detail below.

Figure 8:
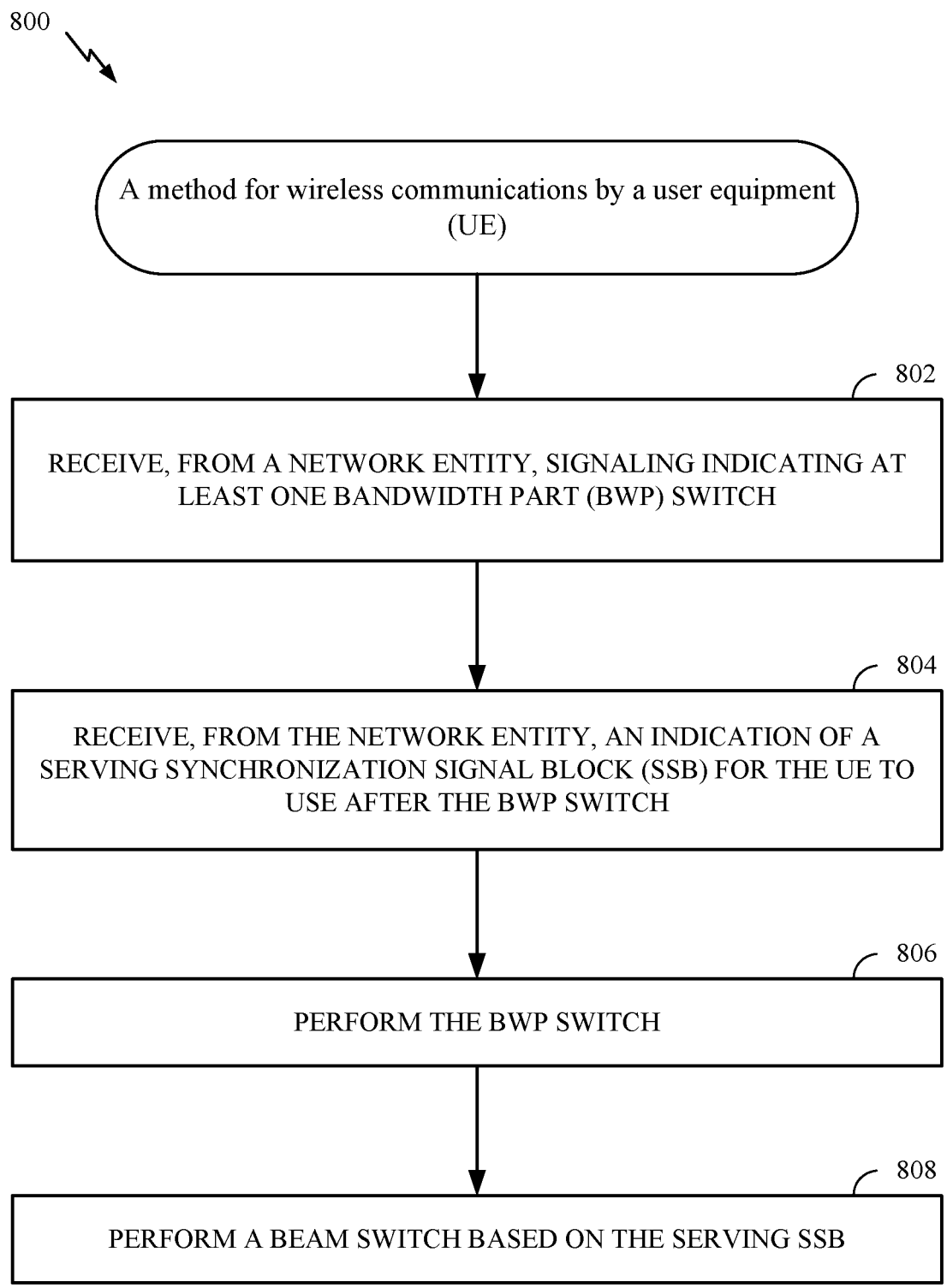
FIG. 8 depicts a flow diagram illustrating example operations for wireless communication by a UE, in accordance with certain aspects of the present disclosure.

FIG. 8 depicts a flow diagram illustrating example operations 800 for wireless communication. The operations 800 may be performed, for example, by a UE (e.g., the UE 104 in the wireless communication network 100 of FIG. 1). The operations 800 may be implemented as software components that are executed and run on one or more processors (e.g., the controller/processor 280 of FIG. 2). Further, transmission and reception of signals by the UE in operations 800 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 800 begin, at 802, by receiving, from a network entity, signaling indicating at least one bandwidth part (BWP) switch. For example, the UE may receive the signaling using antenna(s) and transmitter/transceiver components of the UE 104 shown in FIG. 1 or FIG. 2 and/or of the apparatus shown in FIG. 16. At 804, the UE receives, from the network entity, an indication of a serving SSB for the UE to use after the BWP switch. At 806, the UE performs the BWP switch. At 808, the UE performs beam switch based on the serving SSB.

Figure 9:
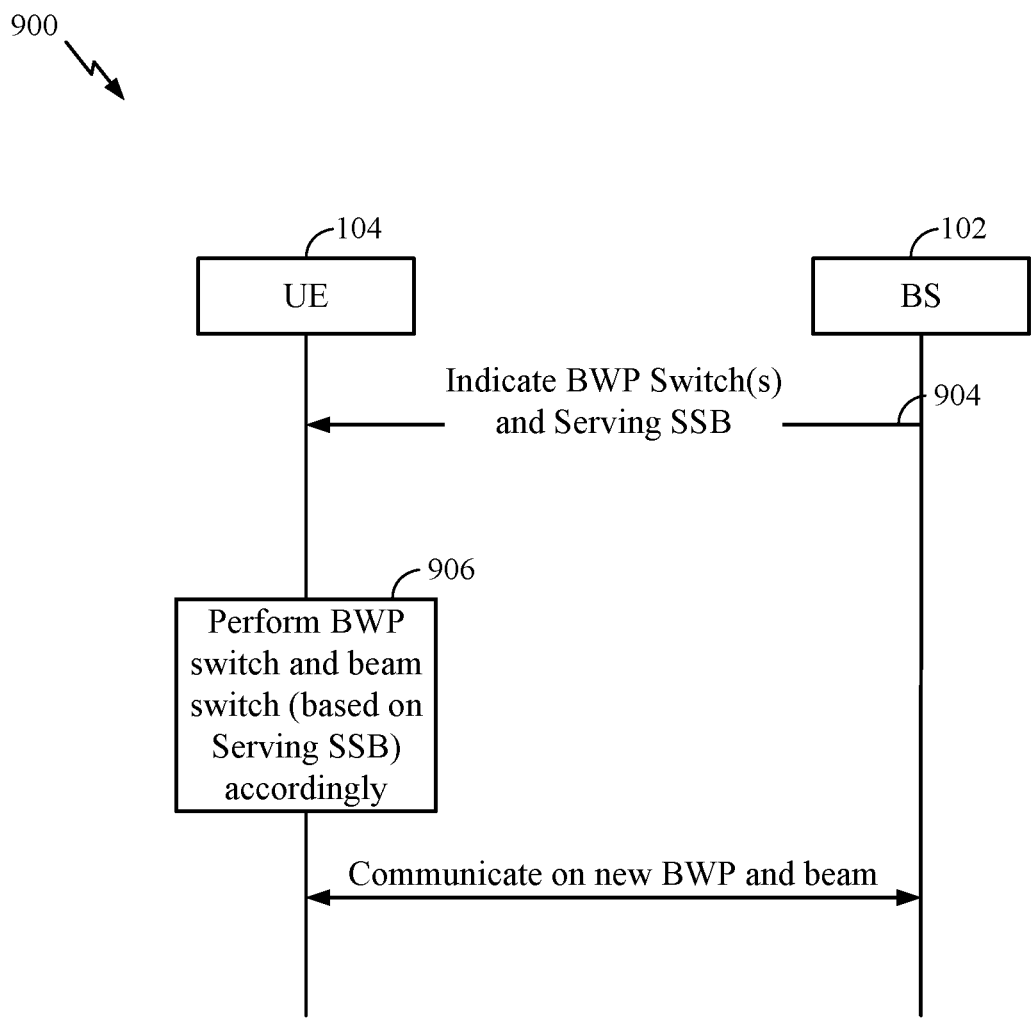
FIG. 9 depicts an example call flow diagram illustrating example operations for wireless communication between the UE and the BS, in accordance with certain aspects of the present disclosure.

The operations 700 and 800 of FIGS. 7 and 8 may be further understood within reference to the call flow diagram 900 of FIG. 9, which depicts an example call flow diagram 900 illustrating example operations for wireless communication between the UE 104 and a network entity (e.g., BS 102). The UE 104 and BS 102 may perform the operations shown in FIGS. 7 and 8 for identifying the serving beam in the UE.

As shown, at 904, the BS 102 indicates BWP switch(es) and a serving SSB for the UE 104 to use after the BWP switch. As will be described in greater detail below, in some cases, the indication of the BWP switch and the indication of the serving SSB may be signaled separately. Further, in some cases, the BS 102 may indicate to the UE 104 a BWP switch or a sequence of BWPs for switching.

At 906, the UE 104 performs a BWP switch and a beam switch according to the received indication. For example, the beam switch may be based on the indicated serving SSB. The BS 102 and the UE 104 may then communicate on the new BWP using the new beam.

Figure 10:
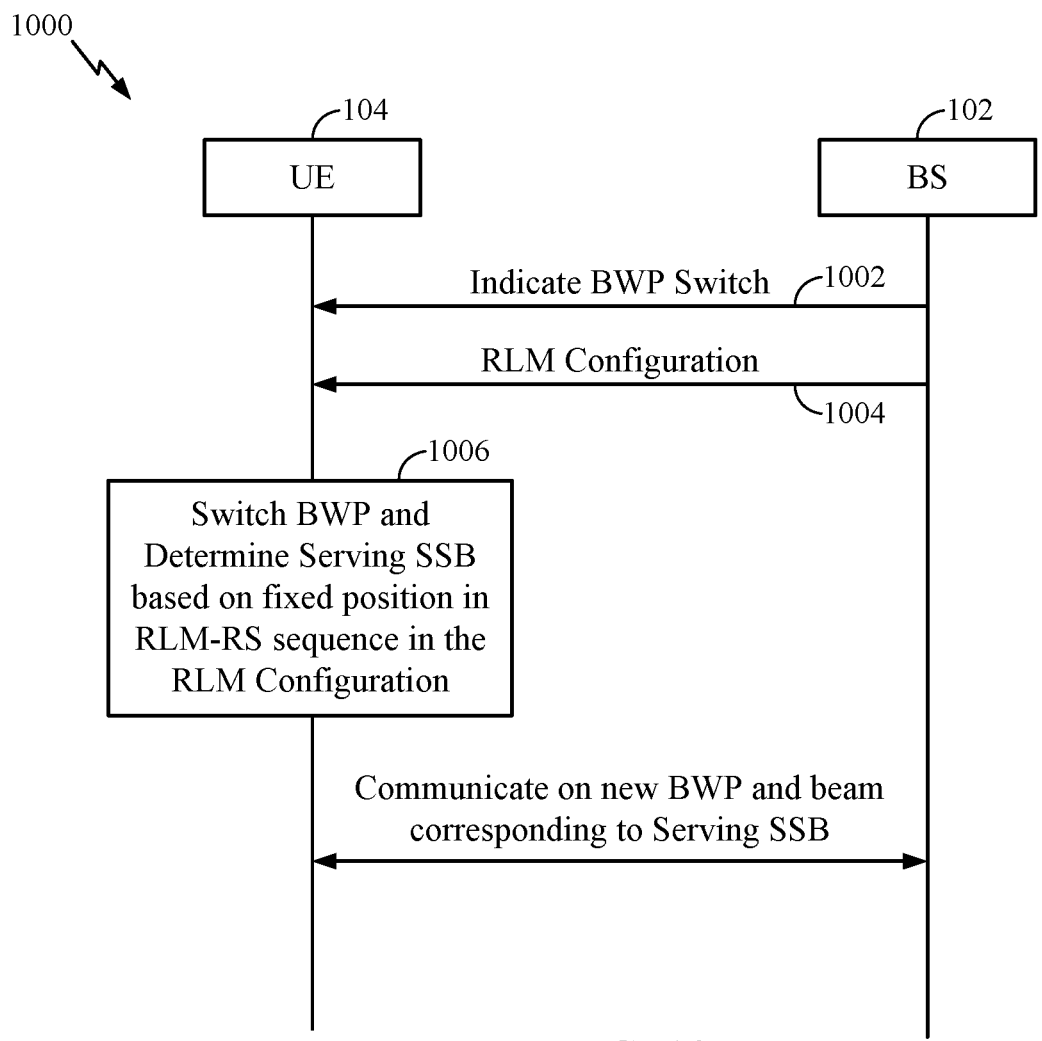
FIG. 10 depicts an example call flow diagram illustrating example operations for wireless communication between the UE and the BS, in accordance with certain aspects of the present disclosure.

In some cases, as illustrated in FIG. 10, the serving SSB after the BWP switch may be indicated via an RLM configuration. For example, after signaling a BWP switch (at 1002), the BS 104 may signal an RLM configuration (at 1004) indicating a serving SSB, for example, via an RRCReconfiguration message.

In some cases, the RLM configuration may be used to provide an implicit indication of the serving SSB after the BWP switch. For example, as previously discussed in FIG. 6, the RLM configuration may provide an association between an RLM-RS ("RadioLinkMonnoringRS") and an SSB-Index. For example, the BS 102 makes the serving SSB at a fixed position, such as the first RLM-RS, or the last RLM-RS, in the RLM-RS sequence of the RLM configuration. The RLM configuration may be signaled via RRC.

At 1006, the UE 104 performs BWP switch and determines the serving SSB based on the fixed position in RLM-RS sequence in the RLM configuration. For example, the UE 104 interprets the SSB (e.g., identified by the SSB-Index carried by the RLM-RS, such as the detection-Resource under the UE's RLM-RS). The serving SSB is associated with the RLM-RS at the fixed position, such as the first RLM-RS or the last RLM-RS in the RLM-RS sequence of the RLM configuration mentioned above. The UE 104 may check on the SSB index 610 in an RLM reconfiguration message (e.g., 1004) received after receiving the BWP switching command (e.g., 1002). After the UE completes BWP switching and beam switching, the UE 104 and the BS 102 communicate on the new BWP and beam corresponding to the serving SSB.

In some cases, the RLM may be configured for pre-scheduled BWP switching. For example, a sequence of BWPs may be transmitted from the BS 102 to the UE 104 at 1002. For each BWP, there is an associated SSB sequence. That is, the signaling from the BS 102 also indicates, for each of the BWP switches, an associated SSB sequence. The UE 104 may perform BWP switches according to the pre-scheduled sequence and determine the serving SSB for a given active BWP based on the associated SSB sequence for that BWP. For example, at a given time period, the UE 104 at least monitors the serving SSB corresponding to at least the active BWP used (e.g., to override any conflicting RLM configuration).

Figure 11:
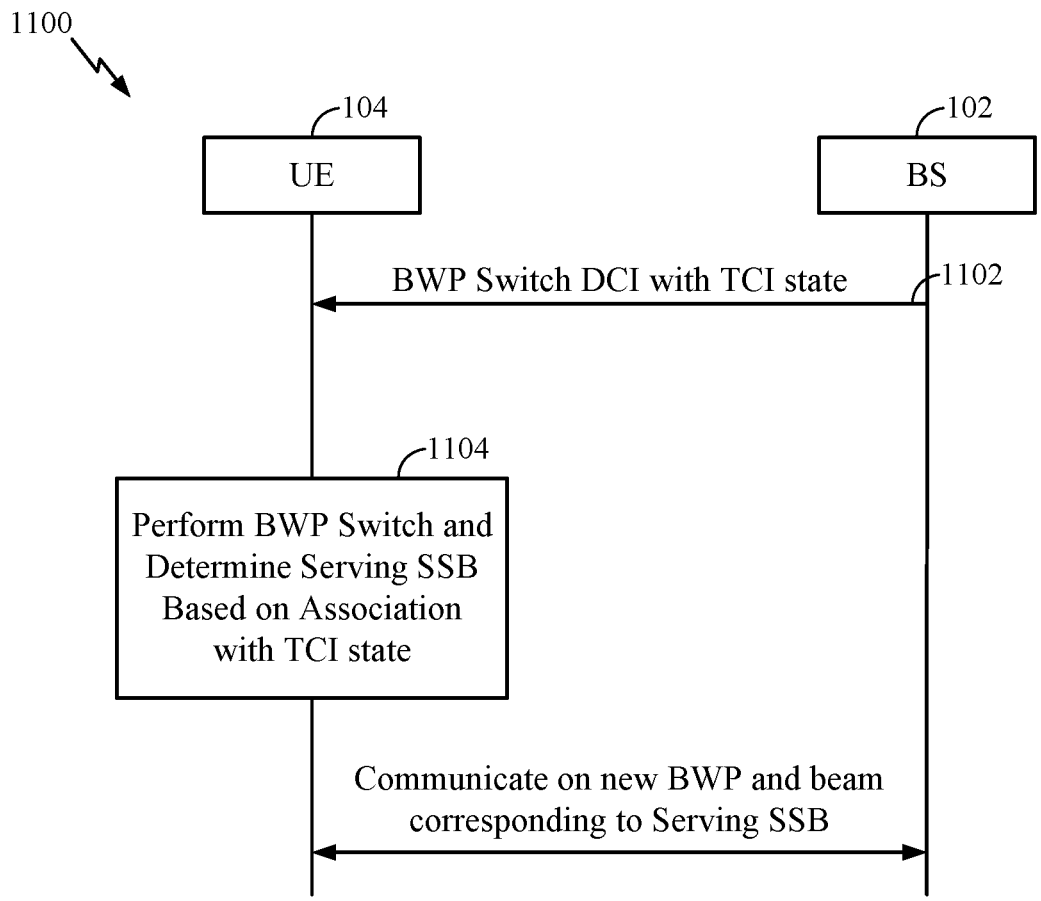
FIG. 11 depicts an example call flow diagram illustrating example operations for wireless communication between the UE and the BS, in accordance with certain aspects of the present disclosure.

In some cases, as illustrated in FIG. 11, the serving SSB after the BWP switch may be indicated via a TCI state. As shown, the BS 102 indicates the BWP switch through a transmission configuration indicator (TCI). At 1102, the BS 102 signals a BWP switch via a DCI that indicates a TCI state. In the BWP switch DCI, if the TCI has an associated SSB, then that SSB may be the serving SSB of the BWP. For example, at 1104, the UE 104 may reinterpret the reference signal identifier (e.g., SSB index 610, or CSI-RS Identifier (CRI)) associated with a QCL-information (e.g., QCL Type D) within a TCI state. In this manner, the QCL-information may be the identifier of the downlink beam that the BS 102 will use to communicate with the UE 104.

In some cases, the BS 102 may transmit a DCI without data (a non-scheduling DCI in that the DCI does not schedule a data transmission). The non-scheduling DCI may include a BWP ID for BWP switching and includes a TCI to indicate the associated SSB (e.g., the serving SSB). In some cases, a non-scheduling DCI may include TCI and at least one of an indication of a first frequency shift for downlink and an indication of a second frequency shift for uplink. The mapping from an indication (e.g., in 3 bits) of a frequency shift to an amount (e.g., in kHz) of frequency shift may be signaled by system information block (SIB), RRC, or MAC CE.

Figure 12:
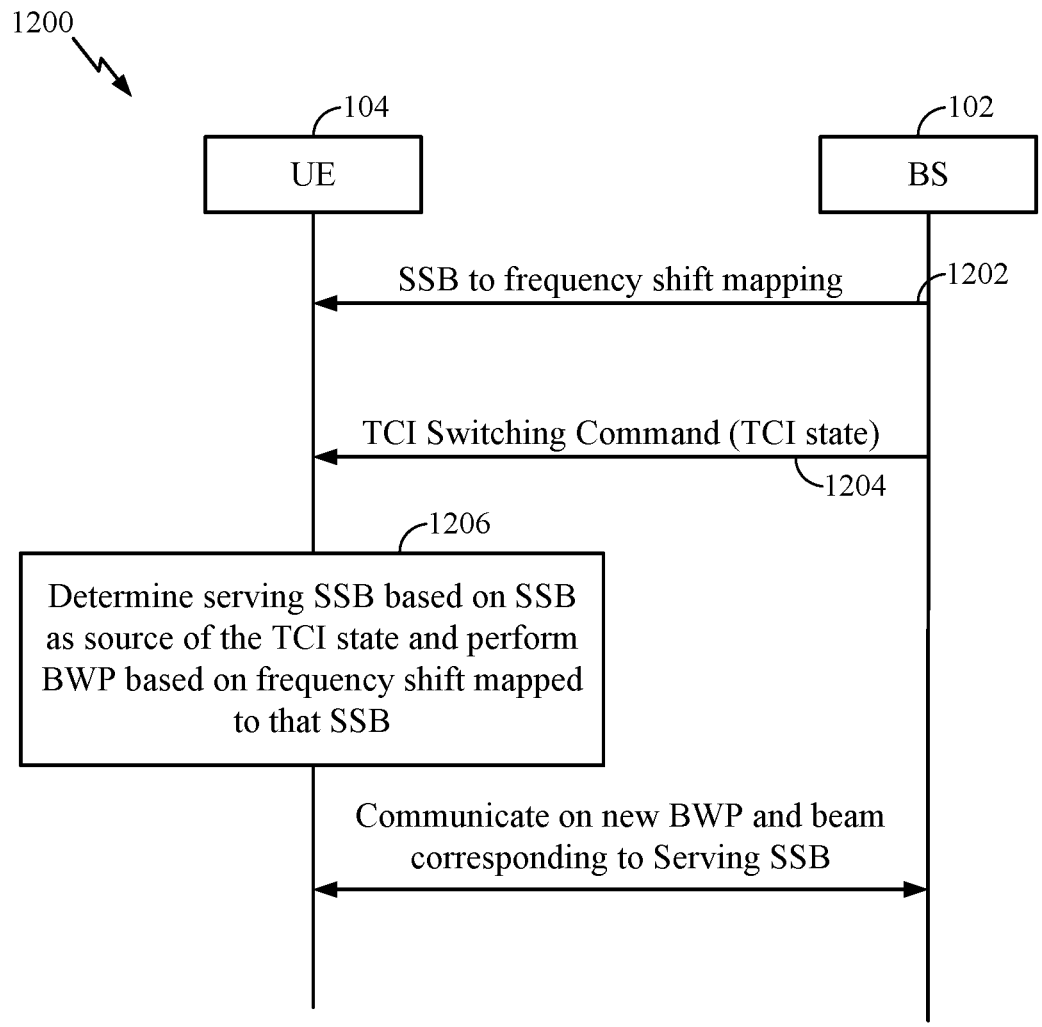
FIG. 12 depicts an example call flow diagram illustrating example operations for wireless communication between the UE and the BS, in accordance with certain aspects of the present disclosure.

In some cases, as illustrated in FIG. 12, the serving SSB may be indicated by an SSB to frequency shift mapping for BWP switching via TCI switching and a frequency shift. As shown, at 1202, the BS 102 may indicate a mapping of SSBs to frequency shifts (e.g., via a SIB). At 1204, the BS 102 signals a BWP switch via a TCI switching command. The TCI switching command may be signaled via DCI, MAC CE, or RRC and may indicate a TCI state with an SSB as the source RS. Thus, the UE may determine, from the TCI bits in the DCI, an associated SSB and refer to the SSB to frequency shift mapping to obtain a frequency shift (at 1206). The UE may then use this frequency shift to perform the BWP switch (e.g., applying the frequency shift mapped to the SSB to obtain a new BWP).

In some aspects, the BS 102 may provide frequency pre-compensation in frequency shifts. For example, if the BS 102 performs frequency pre-compensation for the BWP on each beam (as identified by an SSB index 610, or CSI-RS identifier), then the frequency shifts in a sequence of frequency shifts indicated for the UE 104 to perform a sequence of BWP switching may include the respective frequency pre-compensations. Given this information, the UE may take into account pre-compensation has been performed on the network side. As such, decoding and processing can be more efficient with the pre-compensation information than without the pre-compensation information.

Figure 14:
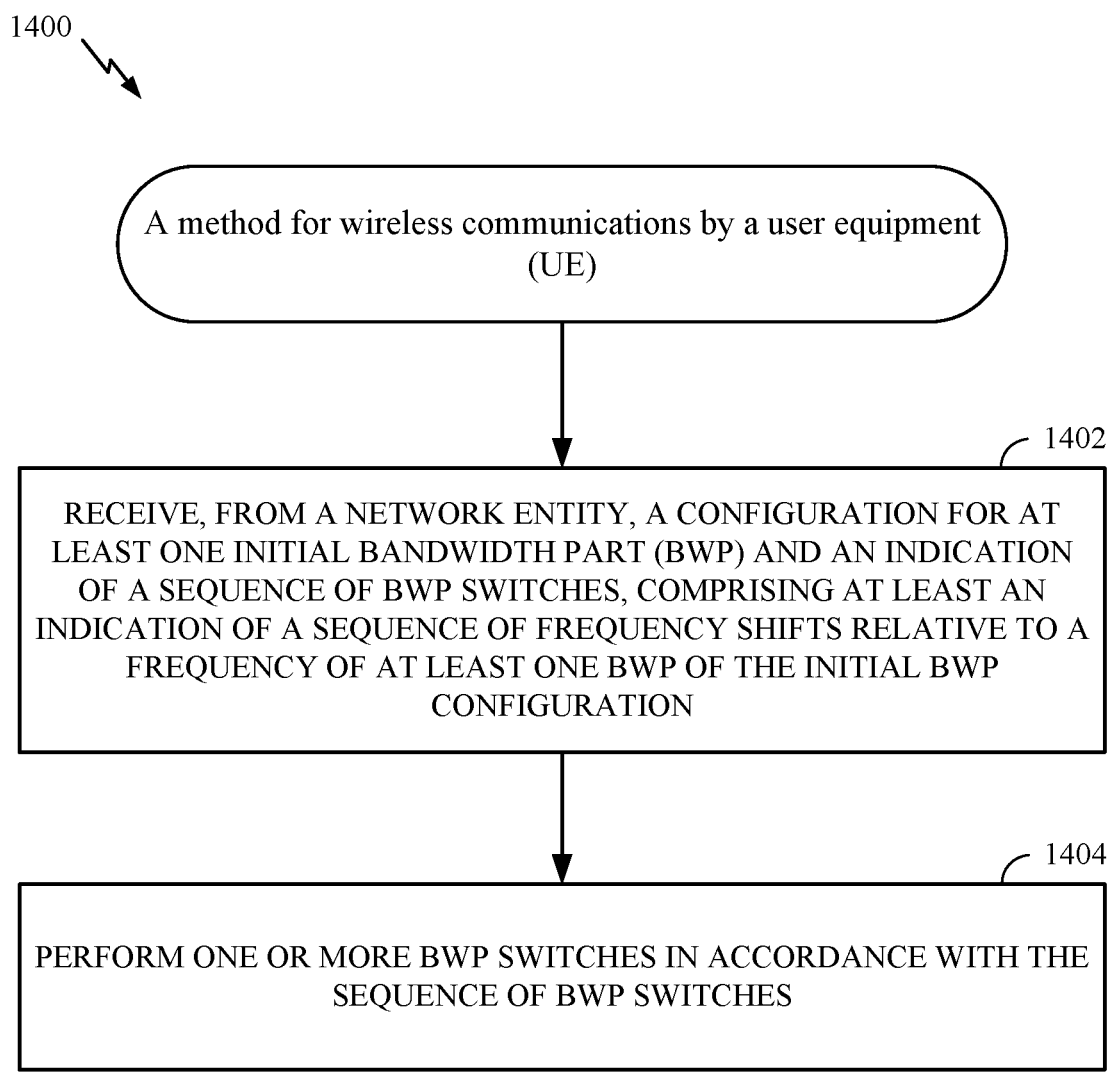
FIG. 14 depicts a flow diagram illustrating example operations for wireless communication by a UE, in accordance with certain aspects of the present disclosure.
Figure 15:
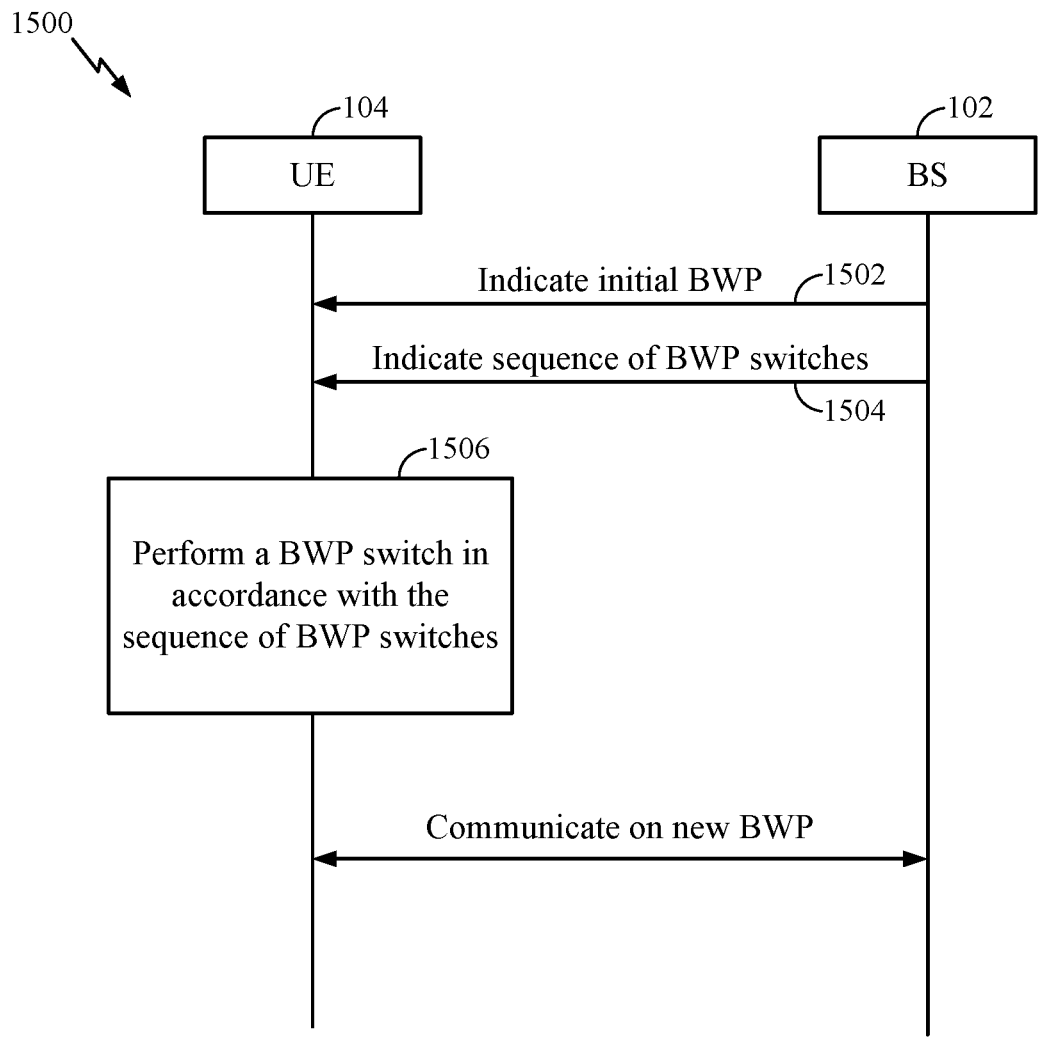
FIG. 15 depicts an example call flow diagram illustrating example operations for wireless communication between the UE and the BS, in accordance with certain aspects of the present disclosure.

As discussed in FIGS. 13-15, a network entity may transmit at least an indication of a sequence of BWP switches based on at least one initial BWP configuration and at least an indication of a sequence of frequency shifts.

In some aspects, the at least one initial BWP is an initial uplink BWP. In some aspects, the at least one initial BWP is an initial downlink BWP. In some aspects, the network entity transmits at least an indication of a schedule (e.g., a sequence of time instants) or a condition (e.g., a sequence of UE locations). In some aspects, the network entity indicates at least a sequence of serving SSB's. In some aspects, the kth SSB in the at least a sequence of serving SSB's is the serving SSB for the BWP determined by the at least one initial BWP and the kth frequency shift in the at least a sequence of frequency shifts. In some aspects, the UE performs BWP switches according to BWPs determined by the at least one initial BWP and the at least a sequence of frequency shifts according to at least a schedule (e.g., at indicated time instants) or condition (e.g., at indicated UE locations).

In some aspects, the UE performs random access procedures (e.g., transmitting a PRACH preamble, or receiving a random access response message) on a BWP of the BWPs determined by the at least one initial BWP and the at least a sequence of frequency shifts. The BWPs determined by the at least one initial BWP and the at least a sequence of frequency shifts may be interpreted as beam specific initial BWPs, where the beam may be identified by one of the at least a sequence of SSB's. A sequence of BWP switches for beam specific initial BWPs may have the advantage that it is easier for the network entity to avoid conflicts (e.g., in resource allocation based on semi-persistent scheduling (SPS) or configured grant (CG)) that might occur in a sequence of BWP switches of UE specific BWPs, because initial BWPs may not have UE-specific configurations.

FIG. 13 is a flow diagram illustrating example operations 1300 for wireless communication. The operations 1300 may be performed, for example, by a network entity (e.g., such as the BS 102 in the wireless communication network 100 of FIG. 1). The operations 1300 may be implemented as software components that are executed and run on one or more processors (e.g., the controller/processor 240 of FIG. 2). Further, transmission and reception of signals by the network entity in operations 1300 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 1300 begin, at 1302, by transmitting, to a UE, a configuration for at least one initial BWP. For example, the at least one initial BWP may include at least one of an initial downlink BWP or an initial uplink BWP. In some aspects, the network entity may transmit at least an indication of a sequence of serving SSB's corresponding to the at least one initial BWP. The network entity may transmit the signaling using antenna(s) and transmitter/transceiver components of the BS 102 shown in FIG. 1 or FIG. 2 and/or of the apparatus shown in FIG. 16.

At 1304, the network entity transmits, to the UE, an indication of a sequence of BWP switches. The indication includes at least an indication of a sequence of frequency shifts relative to a frequency of at least one BWP of the initial BWP configuration. For example, the network entity may send the signaling using antenna(s) and transmitter/transceiver components of the BS 102 shown in FIG. 1 or FIG. 2 and/or of the apparatus shown in FIG. 16. The indication of the serving SSB is discussed in detail below.

FIG. 14 depicts a flow diagram illustrating example operations 1400 for wireless communication. The operations 1400 may be performed, for example, by a UE (e.g., the UE 104 in the wireless communication network 100 of FIG. 1). The operations 1400 may be implemented as software components that are executed and run on one or more processors (e.g., the controller/processor 280 of FIG. 2). Further, transmission and reception of signals by the UE in operations 1400 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1400 begin, at 1402, by receiving, from a network entity, a configuration for at least one initial BWP and an indication of a sequence of BWP switches. The indication includes at least an indication of a sequence of frequency shifts relative to a frequency of at least one BWP of the initial BWP configuration. For example, the UE may receive the signaling using antenna(s) and transmitter/transceiver components of the UE 104 shown in FIG. 1 or FIG. 2 and/or of the apparatus shown in FIG. 17. At 1404, the UE performs one or more BWP switches in accordance with the sequence of BWP switches.

The operations 1300 and 1400 of FIGS. 13 and 14 may be further understood within reference to the call flow diagram 1500 of FIG. 15, which depicts an example call flow diagram 1500 illustrating example operations for wireless communication between the UE 104 and a network entity (e.g., BS 102). The UE 104 and BS 102 may perform the operations shown in FIGS. 13 and 14 for identifying the serving beam in the UE.

As shown, at 1502, the BS 102 indicates a configuration for an initial BWP to the UE 104. This is an example of transmitting or signaling the indication of the BWP switch and an indication of the serving SSB's separately (compared to FIG. 9). At 1504, the BS 102 further indicates a sequence of BWP switches to the UE 104. The sequence of frequency shifts may include an indication of a sequence of frequency shifts relative to a frequency of at least one BWP of the initial BWP configuration.

At 1506, the UE 104 performs a BWP switch in accordance with the sequence of BWP switches. The BS 102 and the UE 104 may then communicate on the new BWP.

In some aspects, the BS 102 transmits an indication of at least one sequence of time instants corresponding to the at least one initial BWP. In some aspects, the BS 102 transmits an indication of at least one sequence of locations corresponding to the at least one initial BWP. In some aspects, the BS 102 receives a random access transmission from the UE 104 on a BWP determined by the initial BWP and one of the frequency shifts. In some aspects, the BS 102 transmits at least an indication of a sequence of serving SSB's corresponding to the at least one initial BWP.

Example Wireless Communication Devices

Figure 16:
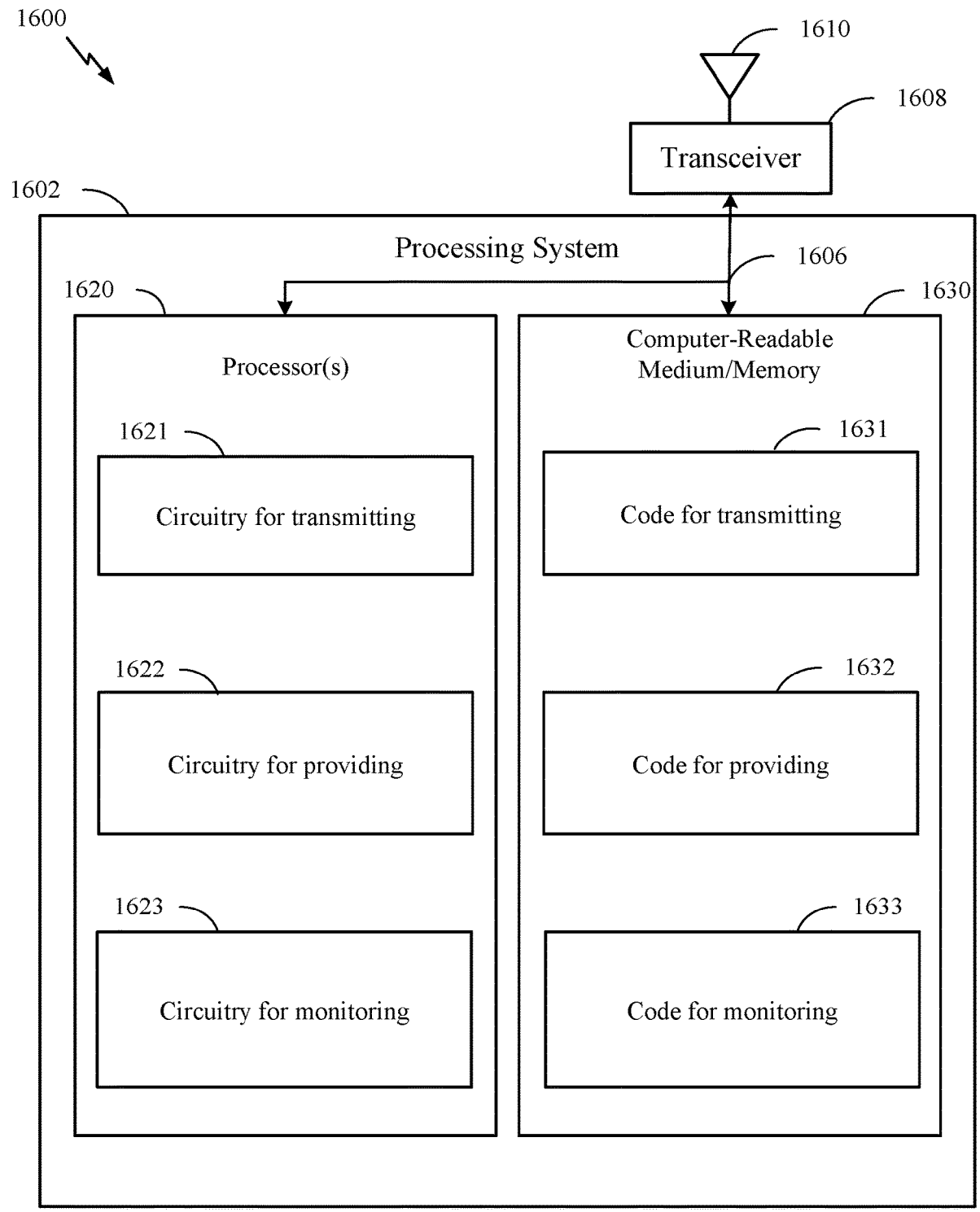
FIGS. 16 and 17 depict example wireless communications devices configured to perform operations for the methods disclosed herein, in accordance with certain aspects of the present disclosure.

FIG. 16 depicts an example communications device 1600 that includes various components operable, configured, or adapted to perform operations for the techniques disclosed herein, such as the operations depicted and described with respect to FIGS. 7 and 13. In some examples, communication device 1600 may be a base station (BS) 102 as described, for example with respect to FIGS. 1 and 2.

Communications device 1600 includes a processing system 1602 coupled to a transceiver 1608 (e.g., a transmitter and/or a receiver). Transceiver 1608 is configured to transmit (or send) and receive signals for the communications device 1600 via an antenna 1610, such as the various signals as described herein. Processing system 1602 may be configured to perform processing functions for communications device 1600, including processing signals received and/or to be transmitted by communications device 1600.

Processing system 1602 includes one or more processors 1620 coupled to a computer-readable medium/memory 1620 via a bus 1606. In certain aspects, computer-readable medium/memory 1620 is configured to store instructions (e.g., computer-executable code) that when executed by the one or more processors 1620, cause the one or more processors 1620 to perform the operations illustrated in FIGS. 7 and 13, or other operations for performing the various techniques discussed herein.

In the depicted example, computer-readable medium/memory 1630 stores code 1631 for transmitting, code 1632 for providing, and code 1633 for monitoring.

In certain aspects, the code 1631 for transmitting includes code for transmitting, to a UE, signaling indicating at least one BWP switch; code for transmitting a downlink control information (DCI); code for transmitting a radio resource control (RRC); code for transmitting medium access control (MAC) control element (CE); code for transmitting a configuration for at least one initial BWP; code for transmitting an indication of a sequence of BWP switches including at least an indication of a sequence of frequency shifts relative to a frequency of at least one BWP of the initial BWP configuration; code for transmitting at least an indication of a sequence of serving SSBs corresponding to the at least an initial BWP; code for transmitting an indication of at least one sequence of time instants corresponding to the at least one initial BWP; and/or code for transmitting an indication of at least one sequence of locations corresponding to the at least one initial BWP.

In certain aspects, the code 1632 for providing includes code for providing, to the UE, an indication of a serving SSB for the UE to use after the BWP switch; code for providing an RLM configuration; code for providing via an association of the serving SSB with an RLM RS at a fixed position in an RLM RS sequence in the RLM configuration; and/or code for providing in a downlink control information (DCI) a transmission configuration indicator (TCI).

In certain aspects, the code 1633 for monitoring includes code for monitoring the SSBs according to the schedule; and code for monitoring at least the SSB corresponding to the active BWP.

In the depicted example, the one or more processors 1620 include circuitry configured to implement the code stored in the computer-readable medium/memory 1620, including circuitry 1621 for transmitting, circuitry 1622 for providing, and circuitry 1623 for monitoring.

In certain aspects, the circuitry 1621 for transmitting includes circuitry for transmitting, to a UE, signaling indicating at least one BWP switch; circuitry for transmitting a downlink control information (DCI); circuitry for transmitting a radio resource control (RRC); circuitry for transmitting medium access control (MAC) control element (CE); circuitry for transmitting a configuration for at least one initial BWP; circuitry for transmitting an indication of a sequence of BWP switches including at least an indication of a sequence of frequency shifts relative to a frequency of at least one BWP of the initial BWP configuration; circuitry for transmitting at least an indication of a sequence of serving SSBs corresponding to the at least an initial BWP; circuitry for transmitting an indication of at least one sequence of time instants corresponding to the at least one initial BWP; and/or circuitry for transmitting an indication of at least one sequence of locations corresponding to the at least one initial BWP.

In certain aspects, the circuitry 1622 for providing includes circuitry for providing, to the UE, an indication of a serving SSB for the UE to use after the BWP switch; circuitry for providing an RLM configuration; circuitry for providing via an association of the serving SSB with an RLM RS at a fixed position in an RLM RS sequence in the RLM configuration; and/or circuitry for providing in a downlink control information (DCI) a transmission configuration indicator (TCI).

In certain aspects, the circuitry 1623 for monitoring includes circuitry for monitoring the SSBs according to the schedule; and code for monitoring at least the SSB corresponding to the active BWP.

Various components of communications device 1600 may provide means for performing the methods described herein, including with respect to FIGS. 7 and 13.

In some examples, means for transmitting or sending (or means for outputting for transmission) may include the transceivers 232 and/or antenna(s) 234 of the BS 102 illustrated in FIG. 2 and/or transceiver 1608 and antenna 1610 of the communication device 1600 in FIG. 16.

In some examples, means for receiving (or means for obtaining) may include the transceivers 232 and/or antenna(s) 234 of the BS 102 illustrated in FIG. 2 and/or transceiver 1608 and antenna 1610 of the communication device 1600 in FIG. 16.

In some examples, means for transmitting to a UE signaling indicating at least one BWP switch; means for providing to the UE an indication of a serving SSB for the UE to use after the BWP switch; means for monitoring the SSB according to the schedule and monitoring at least the SSB corresponding to the active BWP; and means for indicating, via at least one SIB, a mapping between SSBs to frequency shifts may include various processing system components, such as: the one or more processors 1620 in FIG. 2, or aspects of the user equipment 104 depicted in FIG. 2, including receive processor 258, transmit processor 264, TX MIMO processor 266, and/or controller/processor 280 (including SSB interpretation component 281).

Notably, FIG. 16 is just use example, and many other examples and configurations of communication device 1600 are possible.

Figure 17:
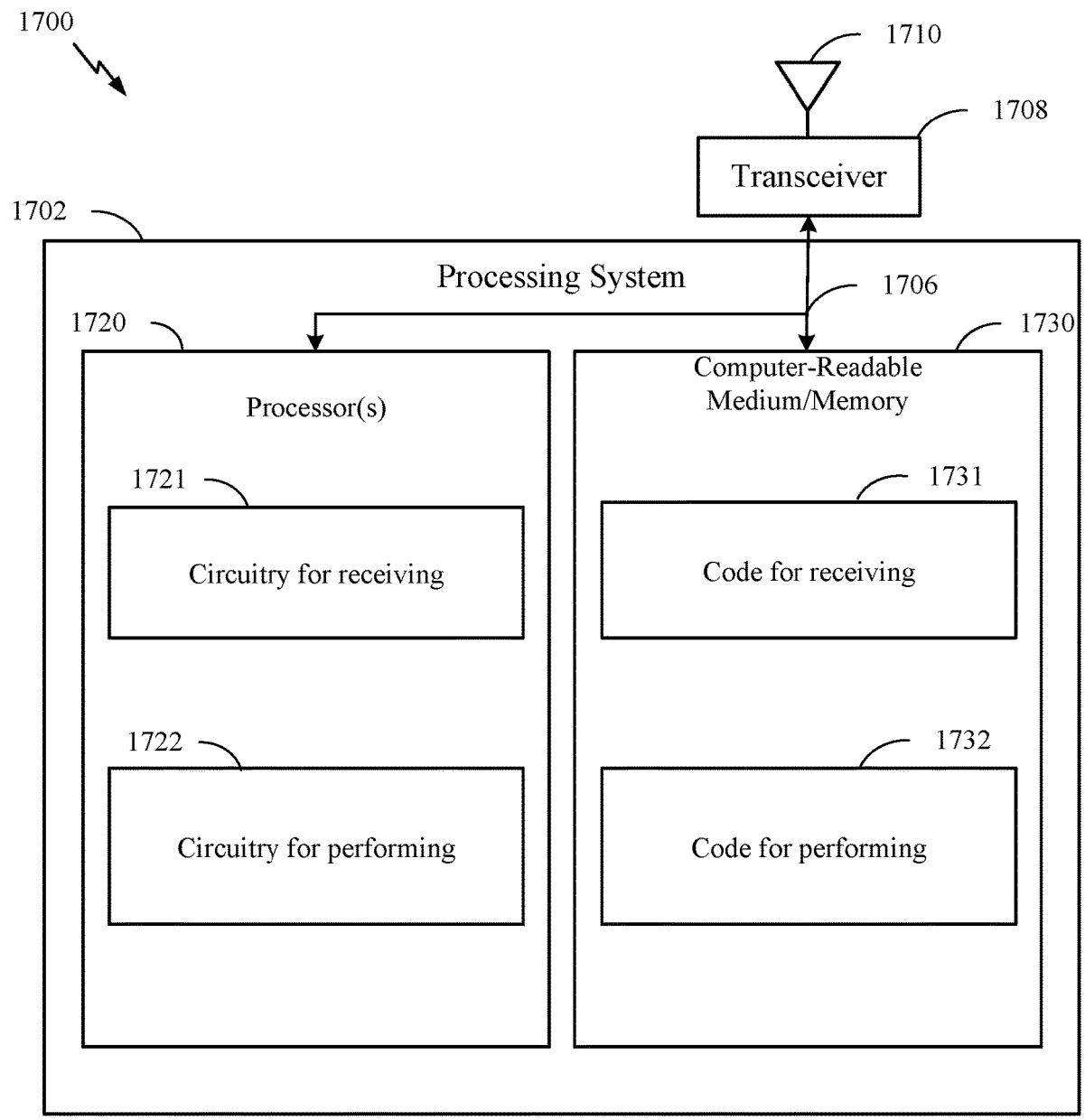

FIG. 17 depicts an example communications device 1700 that includes various components operable, configured, or adapted to perform operations for the techniques disclosed herein, such as the operations depicted and described with respect to FIGS. 8 and 14. In some examples, communication device 1700 may be a base station (BS) 102 as described, for example with respect to FIGS. 1 and 2.

Communications device 1700 includes a processing system 1702 coupled to a transceiver 1708 (e.g., a transmitter and/or a receiver). Transceiver 1708 is configured to transmit (or send) and receive signals for the communications device 1700 via an antenna 1710, such as the various signals as described herein. Processing system 1702 may be configured to perform processing functions for communications device 1700, including processing signals received and/or to be transmitted by communications device 1700.

Processing system 1702 includes one or more processors 1720 coupled to a computer-readable medium/memory 1720 via a bus 1706. In certain aspects, computer-readable medium/memory 1720 is configured to store instructions (e.g., computer-executable code) that when executed by the one or more processors 1720, cause the one or more processors 1720 to perform the operations illustrated in FIGS. 8 and 14, or other operations for performing the various techniques discussed herein.

In the depicted example, computer-readable medium/memory 1730 stores code 1731 for receiving and code 1732 for performing.

In some cases, the code 1731 for receiving may include code for receiving, from a network entity, signaling indicating at least one BWP switch; code for receiving from the network entity, an indication of a serving SSB for the UE to use after the BWP switch, code for receiving an RLM configuration; code for receiving a downlink control information (DCI); code for receiving in a DCI a transmission configuration indicator (TCI); code for receiving a radio resource control (RRC); code for receiving medium access control (MAC) control element (CE); and/or code for receiving a configuration for at least one initial BWP and an indication of a sequence of BWP switches including at least an indication of a sequence of frequency shifts relative to a frequency of at least one BWP of the initial BWP configuration.

In some cases, the code 1732 for performing may include code for performing the BWP switch; code for performing a beam switch based on the serving SSB; and/or code for performing one or more BWP switches in accordance with the sequence of BWP switches.

In the depicted example, the one or more processors 1720 include circuitry configured to implement the code stored in the computer-readable medium/memory 1720, including circuitry 1721 for receiving and circuitry 1722 for interpreting.

In some cases, the circuitry 1721 for receiving may include circuitry for receiving, from a network entity, signaling indicating at least one BWP switch; circuitry for receiving from the network entity, an indication of a serving SSB for the UE to use after the BWP switch, circuitry for receiving an RLM configuration; circuitry for receiving a downlink control information (DCI); circuitry for receiving in a DCI a transmission configuration indicator (TCI); circuitry for receiving a radio resource control (RRC); circuitry for receiving medium access control (MAC) control element (CE); and/or circuitry for receiving a configuration for at least one initial BWP and an indication of a sequence of BWP switches including at least an indication of a sequence of frequency shifts relative to a frequency of at least one BWP of the initial BWP configuration.

In some cases, the circuitry 1722 for performing may include circuitry for performing the BWP switch; circuitry for performing a beam switch based on the serving SSB and/or circuitry for performing one or more BWP switches in accordance with the sequence of BWP switches.

Various components of communications device 1700 may provide means for performing the methods described herein, including with respect to FIGS. 8 and 14.

In some examples, means for transmitting or sending (or means for outputting for transmission) may include the transceivers 254 and/or antenna(s) 252 of the UE 104 illustrated in FIG. 2 and/or transceiver 1708 and antenna 1710 of the communication device 1700 in FIG. 17.

In some examples, means for receiving (or means for obtaining) may include the transceivers 254 and/or antenna(s) 252 of the UE 104 illustrated in FIG. 2 and/or transceiver 1708 and antenna 1710 of the communication device 1700 in FIG. 17.

In some examples, means for means for receiving from a network entity signaling indicating at least one BWP switch; means for receiving an indication of serving SSB for the UE to use after the beam switch; means for performing the BWP switch; means for performing a beam switch based on the serving SSB; and/or means for receiving, via at least one SIB, a mapping between SSBs to frequency shifts may include various processing system components, such as: the one or more processors 1720 in FIG. 17, or aspects of the BS 102 depicted in FIG. 2, including receive processor 238, transmit processor 220, TX MIMO processor 230, and/or controller/processor 240 (including SSB indication component 241).

Notably, FIG. 17 is just use example, and many other examples and configurations of communication device 1700 are possible.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmW), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for B S 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

For example, as shown in FIG. 2, the controller/processor 240 of the BS 102 has SSB indication component 241 that may be configured to perform the operations shown in FIGS. 7 and 13, as well as other operations described herein for providing power control parameters for channels and/or reference signals sharing a same common TCI state. As shown in FIG. 2, the controller/processor 280 of the UE 104 has an SSB interpretation component 281 that may be configured to perform the operations shown in FIGS. 8 and 14, as well as other operations described herein for receiving power control parameters for channels and/or reference signals sharing a same common TCI state. Although shown at the controller/processor, other components of UE 104 and BS 102 may be used to perform the operations described herein.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots.

Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block.

The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of power control parameters for uplink channels and/or reference signals sharing a same common TCI state in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7, 8, 13, and 14, as well as other operations described herein for providing/receiving power control parameters for channels and/or reference signals sharing a same common TCI state.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated herein. Various modifications, changes and variations may be made in the arrangement, operation, and details of the methods and apparatus described herein.

The invention claimed is:

1. A user equipment (UE) configured for wireless communications, comprising: a memory comprising computer-executable instructions; and one or more processors configured to execute the computer-executable instructions and cause the UE to:
   receive, from a network entity, signaling indicating at least one bandwidth part (BWP) switch;
   receive, from the network entity, an indication of a serving synchronization signal block (SSB) for the UE to use after the BWP switch;
   perform the BWP switch; and
   perform a beam switch based on the serving SSB,
   wherein the at least one BWP switch comprises a sequence of BWP switches indicated via a sequence of frequency shifts, and
   wherein the frequency shifts are based on frequency pre-compensation for corresponding BWPs.

2. The UE of claim 1, wherein the network entity comprises a non-terrestrial network (NTN) network entity.

3. The UE of claim 1, wherein to receive the indication of the serving SSB, the one or more processors are configured to execute the computer-executable instructions and cause the UE to receive the indication via a radio link monitoring (RLM) configuration.

4. The UE of claim 3, wherein to receive the indication, the one or more processors are configured to execute the computer-executable instructions and cause the UE to receive the indication via an association of the serving SSB with an RLM reference signal (RS) at a fixed position in an RLM RS sequence in the RLM configuration.

5. The UE of claim 4, wherein the serving SSB is associated with a first RLM-RS or a last RLM RS in the RLM RS sequence.

6. The UE of claim 2, wherein:
the at least one BWP switch comprises a sequence of BWP switches; and
the signaling also indicates a schedule indicating, for each BWP switch in the sequence, an associated time at which the UE is expected to perform that BWP switch.

7. The UE of claim 6, wherein the signaling also indicates, for each of the BWP switches, an associated SSB sequence.

8. The UE of claim 1, wherein to receive the indication of the serving SSB, the one or more processors are configured to execute the computer-executable instructions and cause the UE to receive the indication is provided via a transmission configuration indicator (TCI) provided in a downlink control information (DCI) indicating the BWP switch.

9. The UE of claim 8, wherein the DCI comprises a non-scheduling DCI that includes a BWP ID for the BWP switch.

10. The UE of claim 8, wherein the DCI comprises a non-scheduling DCI that indicates at least one frequency hop for the UE to apply to determine a BWP for the BWP switch based on a current BWP.

11. The UE of claim 10, wherein the DCI indicates at least one frequency hopping sequence for determining at least one of uplink or downlink BWP switches.

12. A user equipment (UE) configured for wireless communication, comprising: a memory comprising computer-executable instructions; and one or more processors configured to execute the computer-executable instructions and cause the UE to:
receive, from a network entity, signaling indicating at least one bandwidth part (BWP) switch;
receive, from the network entity, an indication of a serving synchronization signal block (SSB) for the UE to use after the BWP switch;
perform the BWP switch;
perform a beam switch based on the serving SSB; and
receive, via at least one system information blocks (SIB), a mapping between SSBs to frequency shifts,
wherein the signaling indicating at least one BWP switch comprises a command to switch to a transmission configuration indicator (TCI) state with an SSB as a source of the TCI state.

13. The UE of claim 12, wherein the one or more processors are configured to execute the computer-executable instructions and cause the UE to determine a frequency shift based on the mapping and the SSB associated with the TCI.

14. The UE of claim 12, wherein:
the at least one BWP switch comprises a sequence of BWP switches indicated via a sequence of frequency shifts; and
the frequency shifts are based on frequency pre-compensation for corresponding BWPs.

15. A network entity configured for wireless communication, comprising: a memory comprising computer-executable instructions; and one or more processors configured to execute the computer-executable instructions and cause the network entity to:
transmit, to a user equipment (UE), signaling indicating at least one bandwidth part (BWP) switch; and
provide, to the UE, an indication of a serving synchronization signal block (SSB) for the UE to use after the BWP switch,
wherein the at least one BWP switch comprises a sequence of BWP switches indicated via a sequence of frequency shifts; and
wherein the frequency shifts are based on frequency pre-compensation for corresponding BWPs.

16. The network entity of claim 15, wherein the network entity comprises a non-terrestrial network (NTN) network entity.

17. The network entity of claim 15, wherein to provide the indication of the serving SSB, the one or more processors are configured to execute the computer-executable instructions and cause the network entity to provide the indication via a radio link monitoring (RLM) configuration.

18. The network entity of claim 17, wherein to provide the indication, the one or more processors are configured to execute the computer-executable instructions and cause the network entity to provide the indication via an association of the serving SSB with an RLM reference signal (RS) at a fixed position in an RLM RS sequence in the RLM configuration.

19. The network entity of claim 18, wherein the serving SSB is associated with a first RLM-RS or a last RLM RS in the RLM RS sequence.

20. The network entity of claim 15, wherein to provide the indication of the serving SSB, the one or more processors are configured to execute the computer-executable instructions and cause the network entity to provide the indication is provided via a transmission configuration indicator (TCI) provided in a non-scheduling downlink control information (DCI) indicating the BWP switch.

21. The network entity of claim 20, wherein the DCI comprises a non-scheduling DCI that includes a BWP ID for the BWP switch.

22. The network entity of claim 20, wherein the DCI comprises a non-scheduling DCI that indicates at least one of the following: (1) a first frequency hop for the UE to apply to determine a DL BWP for the DL BWP switch based on a current DL BWP, and (2) a second frequency hop for the UE to apply to determine an UL BWP for the UL BWP switch based on a current UL BWP.

23. A network entity configured for wireless communication, comprising: a memory comprising computer-executable instructions; and one or more processors configured to execute the computer-executable instructions and cause the network entity to:
transmit, to a user equipment (UE), signaling indicating at least one bandwidth part BWP) switch;
provide, to the UE, an indication of a serving synchronization signal block (SSB) for the UE to use after the BWP switch; and
indicate, via at least one system information blocks (SIB), a mapping between SSBs to frequency shifts,
wherein the signaling indicating at least one BWP switch comprises a command to switch to a transmission configuration indicator (TCI) state with an SSB as a source of the TCI state.

24. The network entity of claim 23, wherein:
the at least one BWP switch comprises a sequence of BWP switches; and
the signaling also indicates a schedule indicating, for each BWP switch in the sequence, an associated time at which the UE is expected to perform that BWP switch.

25. The network entity of claim 24, wherein the signaling also indicates, for each of the BWP switches, an associated SSB sequence.

26. The network entity of claim 25, wherein the one or more processors are configured to execute the computer-executable instructions and cause the network entity to:
switch to an active BWP according to the schedule; and
monitor at least the serving SSB associated with the active BWP.

27. The network entity of claim 23, wherein the mapping and the SSB associated with the TCI are configured for used by the UE to determine a frequency shift for performing the BWP switch.

28. The network entity of claim 23, wherein:
the at least one BWP switch comprises a sequence of BWP switches indicated via a sequence of frequency shifts; and
the frequency shifts are based on frequency pre-compensation for corresponding BWPs.

* * * * *